US011875198B2

(12) United States Patent
Shveidel et al.

(10) Patent No.: US 11,875,198 B2
(45) Date of Patent: Jan. 16, 2024

(54) SYNCHRONIZATION OBJECT ISSUE DETECTION USING OBJECT TYPE QUEUES AND ASSOCIATED MONITOR THREADS IN A STORAGE SYSTEM

(71) Applicant: EMC IP Holding Company LLC, Hopkinton, MA (US)

(72) Inventors: Vladimir Shveidel, Pardes-Hana (IL); Lior Kamran, Rishon LeZion (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 313 days.

(21) Appl. No.: 17/208,295

(22) Filed: Mar. 22, 2021

(65) Prior Publication Data

US 2022/0300349 A1    Sep. 22, 2022

(51) Int. Cl.
   *G06F 9/52*    (2006.01)
   *G06F 9/48*    (2006.01)
   (Continued)

(52) U.S. Cl.
   CPC .......... *G06F 9/522* (2013.01); *G06F 9/30087* (2013.01); *G06F 9/3877* (2013.01); *G06F 9/4881* (2013.01); *G06F 9/5038* (2013.01)

(58) Field of Classification Search
   None
   See application file for complete search history.

(56) References Cited

U.S. PATENT DOCUMENTS

| 6,530,042 | B1 * | 3/2003 | Davidson | ............ | G06F 11/3409 |
| | | | | | 714/47.1 |
| 7,043,725 | B1 * | 5/2006 | Krishnan | ................ | G06F 9/455 |
| | | | | | 718/1 |

(Continued)

FOREIGN PATENT DOCUMENTS

| WO | 2016111954 A1 | 7/2016 |
| WO | PCT/US2019/024885 | 1/2020 |

(Continued)

OTHER PUBLICATIONS

EMC Corporation, "Introduction to the EMC XtremIO Storage Array (Ver. 4.0): A Detailed Review," White Paper, Apr. 2015, 65 pages.
EMC Corporation, "Unstoppable Data Reduction: Always-on, In-Line, Zero-Penalty, Enterprise-Class, Free," https://store.emc.com/xtremio, Jul. 2014, 2 pages.
EMC Corporation, "Introduction to XtremIO Virtual Copies," White Paper, Mar. 2016, 39 pages.

(Continued)

*Primary Examiner* — Meng Ai T An
*Assistant Examiner* — Zujia Xu
(74) *Attorney, Agent, or Firm* — Ryan, Mason & Lewis, LLP

(57) ABSTRACT

At least one processing device comprises a processor and a memory coupled to the processor. The at least one processing device is configured to establish one or more groups of synchronization objects in a storage system based at least in part on object type, and for each of the one or more groups, to insert entries into a corresponding object type queue for respective objects of the group, to execute a monitor thread for the group, the monitor thread being configured to scan the entries of the corresponding object type queue, and responsive to at least one of the scanned entries meeting one or more designated conditions, to take at least one automated action for its associated object. The synchronization objects illustratively comprise respective locks, or other objects. The at least one processing device illustratively comprises at least a subset of a plurality of processing cores of the storage system.

20 Claims, 7 Drawing Sheets

(51) Int. Cl.
  *G06F 9/38* (2018.01)
  *G06F 9/30* (2018.01)
  *G06F 9/50* (2006.01)

(56) References Cited

U.S. PATENT DOCUMENTS

| | | | |
|---|---|---|---|
| 7,165,155 B1 | 1/2007 | Duprey et al. | |
| 7,398,471 B1* | 7/2008 | Rambacher | H04L 67/306 |
| | | | 709/224 |
| 7,440,982 B2 | 10/2008 | Lu et al. | |
| 7,444,464 B2 | 10/2008 | Urmston et al. | |
| 8,095,726 B1 | 1/2012 | O'Connell et al. | |
| 8,214,612 B1 | 7/2012 | Natanzon | |
| 8,301,593 B2 | 10/2012 | Hoffmann et al. | |
| 8,335,899 B1 | 12/2012 | Meiri et al. | |
| 8,336,056 B1* | 12/2012 | Gadir | G06F 9/5027 |
| | | | 718/100 |
| 9,104,326 B2 | 8/2015 | Frank et al. | |
| 9,208,162 B1 | 12/2015 | Hallak et al. | |
| 9,286,003 B1 | 3/2016 | Hallak et al. | |
| 9,507,798 B1* | 11/2016 | Zhao | G06F 16/1734 |
| 9,514,014 B2 | 12/2016 | Webman et al. | |
| 9,552,258 B2 | 1/2017 | Hallak et al. | |
| 9,606,870 B1 | 3/2017 | Meiri et al. | |
| 9,716,754 B2 | 7/2017 | Swift | |
| 9,891,994 B1 | 2/2018 | Schneider et al. | |
| 9,983,937 B1 | 5/2018 | Shveidel | |
| 10,048,874 B1 | 8/2018 | Shveidel et al. | |
| 10,152,232 B1 | 12/2018 | Kleiner et al. | |
| 10,176,046 B1 | 1/2019 | Hu et al. | |
| 10,261,693 B1 | 4/2019 | Schneider et al. | |
| 10,324,640 B1 | 6/2019 | Chen et al. | |
| 10,338,851 B1 | 7/2019 | Kronrod et al. | |
| 10,359,965 B1 | 7/2019 | Stronge et al. | |
| 10,394,485 B1 | 8/2019 | Chen et al. | |
| 10,437,501 B1 | 10/2019 | Kucherov et al. | |
| 10,437,855 B1 | 10/2019 | Stronge et al. | |
| 10,466,925 B1 | 11/2019 | Blanco et al. | |
| 10,474,496 B1 | 11/2019 | Kamran et al. | |
| 10,496,324 B2 | 12/2019 | Meiri et al. | |
| 10,496,489 B1 | 12/2019 | Chen et al. | |
| 10,496,672 B2 | 12/2019 | Meiri et al. | |
| 10,558,613 B1 | 2/2020 | Shveidel et al. | |
| 10,592,159 B2 | 3/2020 | Kucherov et al. | |
| 10,592,161 B1 | 3/2020 | Chen et al. | |
| 10,606,519 B1 | 3/2020 | Shveidel | |
| 10,635,533 B2 | 4/2020 | Schneider et al. | |
| 10,656,966 B1* | 5/2020 | Grubin | G06F 9/5033 |
| 10,684,915 B2 | 6/2020 | Schneider et al. | |
| 10,691,355 B2 | 6/2020 | Kucherov et al. | |
| 10,691,373 B2 | 6/2020 | Harduf et al. | |
| 10,691,551 B2 | 6/2020 | Meiri et al. | |
| 10,698,772 B2 | 6/2020 | Hu et al. | |
| 10,705,965 B2 | 7/2020 | Shveidel et al. | |
| 10,719,253 B2 | 7/2020 | Alkalay et al. | |
| 10,725,855 B2 | 7/2020 | Shani et al. | |
| 10,754,559 B1 | 8/2020 | Meiri et al. | |
| 10,754,575 B2 | 8/2020 | Stronge | |
| 10,754,736 B2 | 8/2020 | Shani et al. | |
| 10,761,933 B2 | 9/2020 | Moore et al. | |
| 10,783,038 B2 | 9/2020 | Moore et al. | |
| 10,817,385 B2 | 10/2020 | Meiri et al. | |
| 10,824,512 B2 | 11/2020 | Resnik et al. | |
| 10,826,990 B2 | 11/2020 | Kamran et al. | |
| 10,831,407 B2 | 11/2020 | Glimcher et al. | |
| 10,831,735 B2 | 11/2020 | Schneider et al. | |
| 10,838,863 B2 | 11/2020 | Kamran et al. | |
| 10,846,178 B2 | 11/2020 | Meiri | |
| 10,852,965 B2 | 12/2020 | Glimcher et al. | |
| 10,852,974 B2 | 12/2020 | Kucherov et al. | |
| 10,852,999 B2 | 12/2020 | Schneider et al. | |
| 10,860,234 B2 | 12/2020 | Stronge et al. | |
| 10,860,241 B2 | 12/2020 | Meiri et al. | |
| 10,866,735 B2 | 12/2020 | Meiri et al. | |
| 10,866,760 B2 | 12/2020 | Chen et al. | |
| 10,866,934 B1 | 12/2020 | Chen et al. | |
| 10,866,969 B2 | 12/2020 | Chen et al. | |
| 10,871,960 B2 | 12/2020 | Bashi et al. | |
| 10,871,991 B2 | 12/2020 | Alkalay et al. | |
| 10,884,650 B1 | 1/2021 | Meiri et al. | |
| 10,884,651 B2 | 1/2021 | Chen et al. | |
| 10,884,799 B2 | 1/2021 | Alkalay et al. | |
| 10,891,195 B2 | 1/2021 | Chen | |
| 10,951,699 B1 | 3/2021 | Sayles et al. | |
| 2005/0165881 A1* | 7/2005 | Brooks | G06F 9/5027 |
| | | | 709/200 |
| 2006/0212778 A1* | 9/2006 | Wheeler | G11C 29/52 |
| | | | 714/764 |
| 2007/0022121 A1 | 1/2007 | Bahar et al. | |
| 2007/0050504 A1 | 3/2007 | Gomez et al. | |
| 2008/0279462 A1 | 11/2008 | Celi, Jr. | |
| 2009/0125585 A1* | 5/2009 | Krishnaswamy | H04M 3/4878 |
| | | | 709/203 |
| 2009/0132955 A1 | 5/2009 | Garg et al. | |
| 2009/0165016 A1* | 6/2009 | Bell, Jr. | G06F 9/5066 |
| | | | 718/107 |
| 2009/0276593 A1 | 11/2009 | Jacobson et al. | |
| 2010/0179941 A1 | 7/2010 | Agrawal et al. | |
| 2010/0293554 A1* | 11/2010 | Rastogi | G06F 9/44505 |
| | | | 717/174 |
| 2010/0315255 A1 | 12/2010 | Chang et al. | |
| 2011/0022566 A1 | 1/2011 | Beaverson et al. | |
| 2011/0225123 A1 | 9/2011 | D'Souza et al. | |
| 2012/0124282 A1 | 5/2012 | Frank et al. | |
| 2013/0080672 A1* | 3/2013 | Tal | G06F 9/526 |
| | | | 710/200 |
| 2013/0305002 A1 | 11/2013 | Hallak et al. | |
| 2013/0325824 A1 | 12/2013 | Shoens | |
| 2014/0181016 A1 | 6/2014 | Whitehead et al. | |
| 2014/0244935 A1 | 8/2014 | Ezra et al. | |
| 2015/0188883 A1* | 7/2015 | Xie | H04L 61/10 |
| | | | 709/245 |
| 2015/0347192 A1* | 12/2015 | Blaine | G06F 9/4881 |
| | | | 718/103 |
| 2015/0378766 A1 | 12/2015 | Beveridge et al. | |
| 2015/0378785 A1 | 12/2015 | Tarasuk-Levin et al. | |
| 2016/0103682 A1* | 4/2016 | Alexander | G06F 12/0811 |
| | | | 711/125 |
| 2016/0150012 A1 | 5/2016 | Barszczak et al. | |
| 2016/0170987 A1 | 6/2016 | Kesselman | |
| 2016/0202927 A1 | 7/2016 | Klarakis et al. | |
| 2016/0224259 A1 | 8/2016 | Ahrens et al. | |
| 2016/0261513 A1 | 9/2016 | Aingaran et al. | |
| 2016/0345207 A1 | 11/2016 | Kwak et al. | |
| 2017/0075842 A1 | 3/2017 | Su et al. | |
| 2017/0185529 A1 | 6/2017 | Chhabra et al. | |
| 2017/0192857 A1 | 7/2017 | Meiri et al. | |
| 2018/0095873 A1 | 4/2018 | Nakagoe et al. | |
| 2019/0303490 A1 | 10/2019 | Chen et al. | |
| 2019/0332314 A1 | 10/2019 | Zhang et al. | |
| 2019/0370354 A1 | 12/2019 | Kucherov et al. | |
| 2019/0370355 A1 | 12/2019 | Kucherov et al. | |
| 2019/0370356 A1 | 12/2019 | Kucherov et al. | |
| 2019/0370357 A1 | 12/2019 | Kucherov et al. | |
| 2019/0392060 A1 | 12/2019 | Meiri et al. | |
| 2020/0026616 A1 | 1/2020 | Hu et al. | |
| 2020/0052901 A1* | 2/2020 | Wicaksono | H04L 67/1095 |
| 2020/0097174 A1 | 3/2020 | Moore et al. | |
| 2020/0097363 A1 | 3/2020 | Moore et al. | |
| 2020/0097393 A1 | 3/2020 | Moore et al. | |
| 2020/0125276 A1 | 4/2020 | Shani et al. | |
| 2020/0218601 A1 | 7/2020 | Schneider et al. | |
| 2020/0218610 A1 | 7/2020 | Schneider et al. | |
| 2020/0225849 A1 | 7/2020 | Meiri et al. | |
| 2020/0226023 A1 | 7/2020 | Meiri | |
| 2020/0226145 A1 | 7/2020 | Meiri | |
| 2020/0233704 A1 | 7/2020 | Alkalay et al. | |
| 2020/0233705 A1 | 7/2020 | Alkalay et al. | |
| 2020/0233881 A1 | 7/2020 | Harduf et al. | |
| 2020/0236117 A1* | 7/2020 | Zingerman | H04L 63/0245 |
| 2020/0242130 A1 | 7/2020 | Chen et al. | |
| 2020/0249868 A1 | 8/2020 | Glimcher et al. | |
| 2020/0249869 A1 | 8/2020 | Glimcher et al. | |

(56) References Cited

U.S. PATENT DOCUMENTS

| | | |
|---|---|---|
| 2020/0250089 A1 | 8/2020 | Kamran et al. |
| 2020/0250144 A1 | 8/2020 | Natanzon et al. |
| 2020/0272542 A1 | 8/2020 | Meiri et al. |
| 2020/0272600 A1 | 8/2020 | Natanzon et al. |
| 2020/0285268 A1 | 9/2020 | Meiri et al. |
| 2020/0285402 A1 | 9/2020 | Meiri et al. |
| 2020/0301784 A1 | 9/2020 | Chen |
| 2020/0310649 A1 | 10/2020 | Chen et al. |
| 2020/0310654 A1 | 10/2020 | Meiri et al. |
| 2020/0326877 A1 | 10/2020 | Chen et al. |
| 2020/0327024 A1 | 10/2020 | Alkalay et al. |
| 2020/0341641 A1 | 10/2020 | Kucherov et al. |
| 2020/0341682 A1 | 10/2020 | Kucherov et al. |
| 2020/0341749 A1 | 10/2020 | Bashi et al. |
| 2020/0364106 A1 | 11/2020 | Chen et al. |
| 2020/0401314 A1 | 12/2020 | Chen et al. |
| 2020/0401315 A1 | 12/2020 | Chen et al. |
| 2021/0034267 A1 | 2/2021 | Kucherov et al. |
| 2021/0096842 A1* | 4/2021 | Borges ............... G06F 8/656 |
| 2022/0100562 A1* | 3/2022 | Vainer ............... G06F 9/4843 |
| 2022/0138175 A1* | 5/2022 | Mahendra Kumar ................. G06F 16/2343 707/694 |

FOREIGN PATENT DOCUMENTS

| | | |
|---|---|---|
| WO | PCT/US2019/024900 | 1/2020 |
| WO | 2020204880 A1 | 10/2020 |
| WO | 2020204882 A1 | 10/2020 |

OTHER PUBLICATIONS

EMC Corporation, "XtremIO Data Protection (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

Dell EMC, "PowerMax OS," Dell EMC PowerMax Family Product Guide, May 2019, 192 pages.

Dell EMC, "Dell EMC VxRack FLEX," Dell EMC Product Overview, 2018, 5 pages.

NVM Express, "NVM Express, Revision 1.3," NVM Express, May 1, 2017, 282 pages.

U.S. Appl. No. 16/663,524 filed in the name of Xiangping Chen et al. Oct. 25, 2019, and entitled "Storage System with Throughput-Based Timing of Synchronous Replication Recovery."

U.S. Appl. No. 16/665,651 filed in the name of Lior Kamran et al. Oct. 28, 2019, and entitled "Recovery Flow with Reduced Address Lock Contention in a Content Addressable Storage System."

U.S. Appl. No. 16/671,824 filed in the name of Lior Kamran et al. Nov. 1, 2019, and entitled "Storage System Capacity Expansion Using Mixed-Capacity Storage Devices."

U.S. Appl. No. 16/693,858 filed in the name of Doron Tal Nov. 25, 2019, and entitled "Storage System with Prioritized RAID Rebuild."

U.S. Appl. No. 16/747,138 filed in the name of Lior Kamran et al. Jan. 20, 2020, and entitled "Performance Monitoring for Storage System with Core Thread Comprising Internal and External Schedulers."

U.S. Appl. No. 16/894,973 filed in the name of Alex Soukhman et al. Jun. 8, 2020, and entitled "Dynamic Modification of IO Shaping Mechanisms of Multiple Storage Nodes in a Distributed Storage System."

U.S. Appl. No. 16/915,380 filed in the name of Vladimir Shveidel et al. Jun. 29, 2020, and entitled "End-to-End Quality of Service Mechanism for Storage System Using Prioritized Thread Queues."

U.S. Appl. No. 17/077,559 filed in the name of Vladimir Shveidel et al. Oct. 22, 2020, and entitled "Storage System with Adaptive Flow Control Using Multiple Feedback Loops."

U.S. Appl. No. 16/952,996 filed in the name of Vladimir Shveidel et al. Nov. 19, 2020, and entitled "Dynamic Slice Assignment in a Distributed Storage System."

U.S. Appl. No. 16/813,012 filed in the name of Alex Soukhman et al. Mar. 9, 2020, and entitled "Bandwidth Efficient Access to Persistent Storage in a Distributed Storage System."

U.S. Appl. No. 17/146,529 filed in the name of Lior Kamran et al. Jan. 12, 2021, and entitled "Alternative Storage Node Communication Channel Using Storage Devices Group in a Distributed Storage System."

* cited by examiner

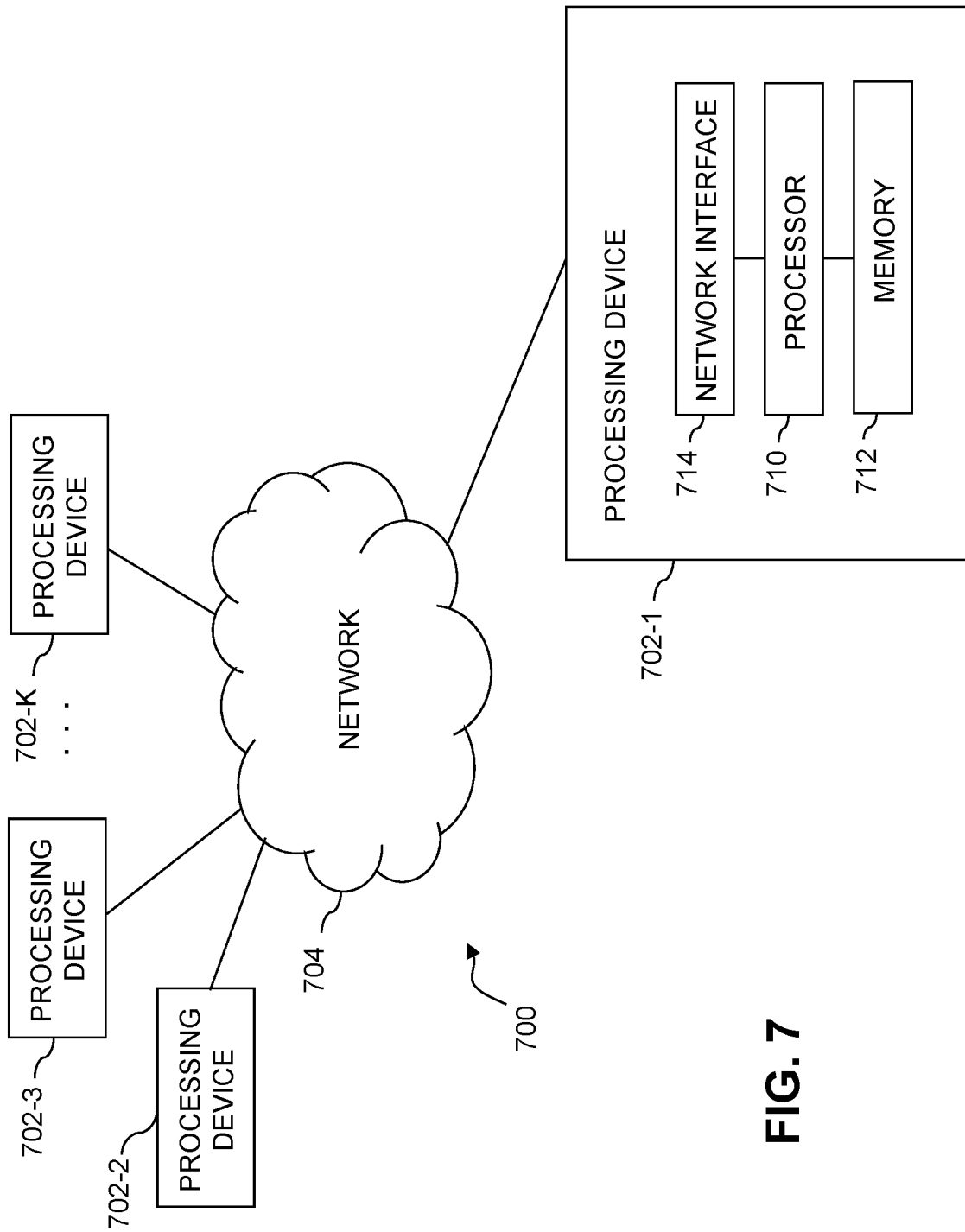

SYNCHRONIZATION OBJECT ISSUE DETECTION USING OBJECT TYPE QUEUES AND ASSOCIATED MONITOR THREADS IN A STORAGE SYSTEM

FIELD

The field relates generally to information processing systems, and more particularly to storage in information processing systems.

BACKGROUND

Information processing systems often include distributed storage systems comprising multiple nodes. Nodes of a distributed storage system may each include multi-core processors that are configured to execute threads associated with various applications. One or more processing cores of a given such multi-core processor illustratively execute the threads associated with a particular application. In some instances, an application may utilize an always-polling model in which threads executing on one or more processing cores poll interfaces of the information processing system for new tasks, events, or other data. In other instances, an application may use an event-driven model in which interrupts are used to activate threads for processing a task, event or other data using the one or more processing cores. Performance monitoring techniques are typically used to monitor the performance of such core threads in these and other contexts, but excessive latencies may nonetheless arise when a given processing core is used to execute multiple threads of one or more applications. For example, such latencies can arise when certain threads hold locks or other types of synchronization objects in the storage system for extended periods of time. In these and other scenarios, it can be difficult to determine the root cause of these latencies and their associated performance impacts.

SUMMARY

Illustrative embodiments provide techniques for detection of performance issues or other types of issues relating to synchronization objects in a distributed storage system or other type of storage system. For example, the disclosed techniques in some embodiments can detect irregular locking scenarios in the storage system.

These and other embodiments advantageously provide a uniform, flexible and extensible framework for monitoring of locks and other synchronization objects in a storage system.

Such arrangements in illustrative embodiments are highly scalable to very large numbers of synchronization objects of different types, can be dynamically adjusted by adding and/or removing objects from an object type group at run-time, and provide improved system stability and performance.

In one embodiment, at least one processing device comprises a processor coupled to a memory, and is configured to establish one or more groups of synchronization objects in a storage system based at least in part on object type, and for each of the one or more groups, to insert entries into a corresponding object type queue for respective objects of the group, to execute a monitor thread for the group, the monitor thread being configured to scan the entries of the corresponding object type queue, and responsive to at least one of the scanned entries meeting one or more designated conditions, to take at least one automated action for its associated object.

The synchronization objects illustratively comprise respective locks in the storage system, although it is to be appreciated that additional or alternative synchronization objects can be used in other embodiments, such as, for example, at least one of a semaphore, a timer, a barrier, a memory pool and a thread pool.

The at least one processing device in some embodiments illustratively comprises at least a subset of a plurality of processing cores of the storage system, although other arrangements are possible.

In some embodiments, the at least one processing device is configured to execute threads of one or more applications utilizing at least one of a plurality of processing cores of the storage system, with the threads of the one or more applications comprising different sub-threads of a first thread of a first application executing on a particular one of the plurality of processing cores of the storage system.

For example, the first application illustratively comprises a block-storage application of the storage system and the first thread illustratively comprises a truck thread that when executing on the particular processing core is configured to utilize at least a portion of available processing resources of that processing core, such as substantially all of the available processing resources of that processing core (e.g., about 90% or more of the available processing resources of the processing core).

Each of the sub-threads of the first thread may be in one of multiple designated states at a particular point in time, such as, for example, a running state, a ready state and a suspended state. Additional or alternative states may be used in other embodiments.

In some embodiments, different ones of the sub-threads that are in the suspended state are illustratively enqueued in respective different ones of a plurality of thread queues in order to wait for access to respective corresponding synchronization objects associated with resources of the particular processing core.

In some embodiments, establishing one or more groups of synchronization objects in a storage system based at least in part on object type comprises receiving registration information for a particular object type via an application programming interface, and establishing a group for the particular object type based at least in part on the registration information.

Different thresholds or other detection conditions are illustratively designated for use with different ones of the groups of synchronization objects.

In some embodiments, the monitor thread is configured to operate in accordance with a series of monitoring cycles. One or more objects added to the group in a given one of the monitoring cycles illustratively have corresponding entries inserted into an additional queue, and the entries inserted into the additional queue are subsequently merged into the object type queue for the group.

For example, the entries in the additional queue for the one or more objects added to the group in the given monitoring cycle in some embodiments are subsequently merged into the object type queue for the group in conjunction with completion of the given monitoring cycle and are monitored by the monitor thread via their entries in the object type queue in a next monitoring cycle.

Additionally or alternatively, one or more objects to be deleted from the group in a given one of the monitoring cycles illustratively have their respective entries marked as deleted in the object type queue in the given monitoring cycle and any entries so marked are removed from the object type queue by the monitor thread in conjunction with the scan of the entries of the object type queue.

In some embodiments, taking at least one automated action comprises executing a callback function specified for the group, with the callback function being specified for the group in conjunction with establishing the group for the object type.

Additionally or alternatively, taking at least one automated action may comprise at least one of generating an alert to at least one other thread, performing one or more diagnostic operations, and storing identifying information of at least one other thread holding the corresponding object. Other types of automated actions or combinations of multiple such automated actions can be used.

These and other illustrative embodiments include, without limitation, apparatus, systems, methods and processor-readable storage media.

BRIEF DESCRIPTION OF THE DRAWINGS

FIGS. 6 and 7 show examples of processing platforms that may be utilized to implement at least a portion of an information processing system in illustrative embodiments.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
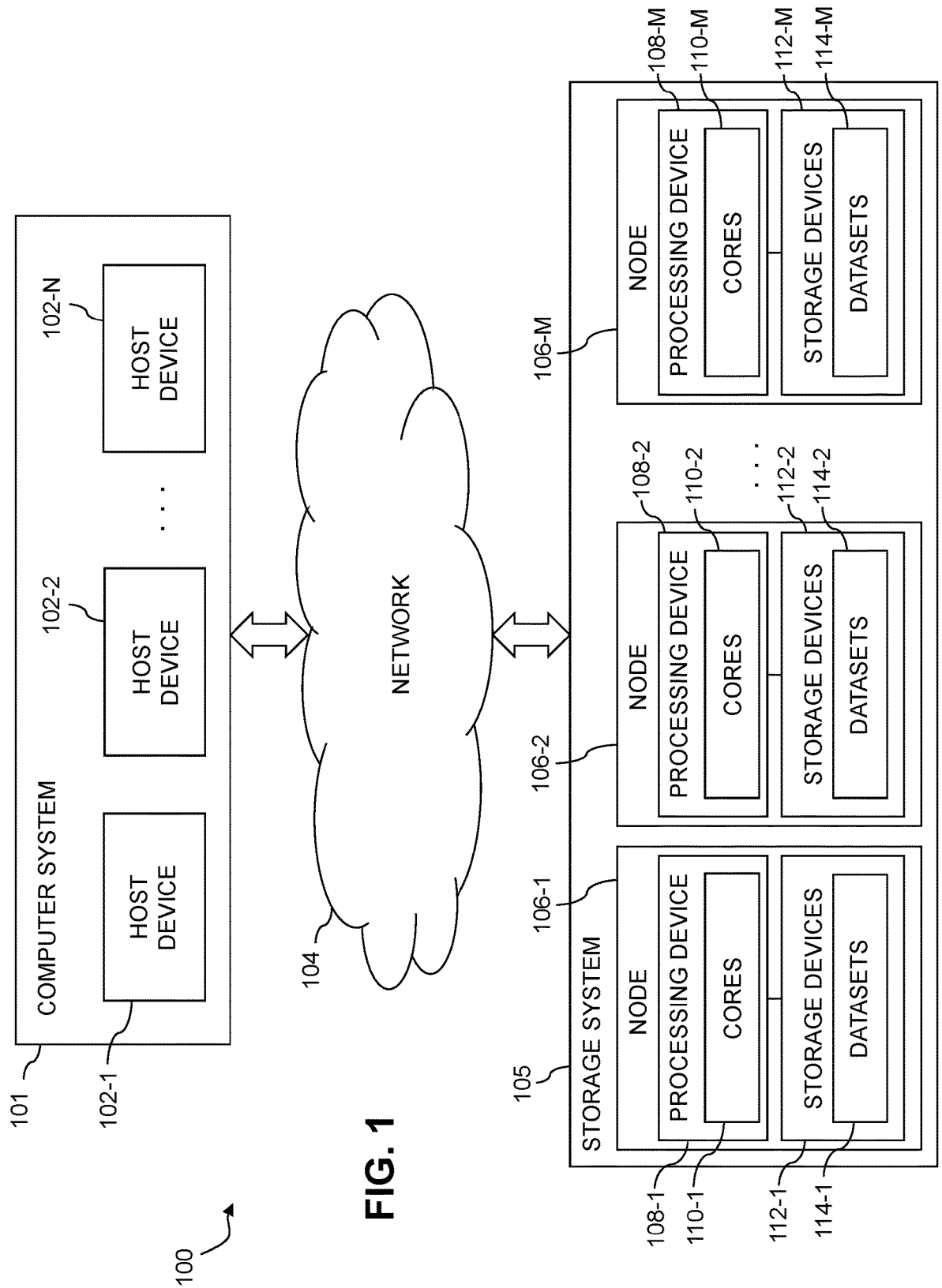
FIG. 1 is a block diagram of an information processing system comprising a storage system configured with functionality for synchronization object issue detection in an illustrative embodiment.

FIG. 1 shows an information processing system 100 configured in accordance with an illustrative embodiment. The information processing system 100 comprises a computer system 101 that includes host devices 102-1, 102-2, . . . 102-N, collectively referred to herein as host devices 102. The host devices 102 communicate over a network 104 with a storage system 105. The storage system 105 is illustratively configured to implement functionality for synchronization object issue detection using object type queues and associated monitor threads, as will be described in more detail below.

The computer system 101 is assumed to comprise an enterprise computer system, cloud-based computer system or other arrangement of multiple compute nodes associated with respective users. The host devices 102 of the computer system 101 in some embodiments illustratively provide compute services such as execution of one or more applications on behalf of each of one or more users associated with respective ones of the host devices 102. Such applications illustratively generate input-output (IO) operations that are processed by the storage system 105. The term "input-output" as used herein refers to at least one of input and output. For example, IO operations may comprise write requests and/or read requests directed to logical addresses of a particular logical storage volume of the storage system 105. These and other types of IO operations are also generally referred to herein as IO requests.

The host devices 102 and storage system 105 illustratively comprise respective processing devices of one or more processing platforms. For example, the host devices 102 and the storage system 105 can each comprise one or more processing devices each comprising a processor and a memory, possibly implementing virtual machines and/or containers, although numerous other configurations are possible.

The host devices 102 and the storage system 105 can additionally or alternatively be part of cloud infrastructure such as an Amazon Web Services (AWS) system. Other examples of cloud-based systems that can be used to provide one or more of host devices 102 and storage system 105 include Google Cloud Platform (GCP) and Microsoft Azure.

The host devices 102 and the storage system 105 may be implemented on a common processing platform, or on separate processing platforms.

The host devices 102 are configured to write data to and read data from the storage system 105 in accordance with applications executing on those host devices 102 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network such as a 4G or 5G network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the host devices 102 over the network 104. The storage system 105 comprises a plurality of nodes 106-1, 106-2, ... 106-M, collectively referred to herein as nodes 106. The storage system 105 comprising nodes 106 is an example of what is also referred to herein as a "distributed storage system" or a "clustered storage system." For example, in some implementations of storage system 105, the nodes 106 are interconnected in a full mesh network, such that each of the nodes 106 can communicate with each of the other nodes 106, although other types of networks and different node interconnection arrangements can be used in other embodiments. At least portions of respective ones of the nodes 106 illustratively implement what is generally referred to herein as a "distributed storage controller" of the storage system 105.

In the FIG. 1 embodiment, the nodes 106-1, 106-2, ... 106-M of the storage system 105 comprise respective processing devices 108-1, 108-2, ... 108-M, collectively referred to herein as processing devices 108. One or more of the nodes 106 may each comprise multiple processing devices 108, although only single instances of such processing devices are shown in the figure. In some embodiments, multiple processing devices 108 of a given one of the nodes 106 may act or function as a single processing device 108.

The processing devices 108-1, 108-2, ... 108-M comprise respective sets of cores 110-1, 110-2, ... 110-M, collectively referred to herein as cores 110. For example, a given processing device 108 may comprise a set of two cores 110, four cores 110, eight cores 110, or any other number of cores 110 appropriate to a given implementation. The processing devices 108 therefore each illustratively comprise a multi-core processor and associated memory.

The nodes 106-1, 106-2, ... 106-M further comprise respective sets of storage devices 112-1, 112-2, ... 112-M, collectively referred to herein as storage devices 112. For example, a given one of the nodes 106 may comprise a single storage device 112, two storage devices 112, four storage devices 112, eight storage devices 112, sixteen storage devices 112, thirty-two storage devices 112 or any other number of storage devices 112. The storage devices 112-1, 112-2, ... 112-M store respective datasets 114-1, 114-2, ... 114-M, collectively referred to herein as datasets 114, which illustratively comprise logical units (LUNs) or other types of logical storage volumes, as well as snapshots and/or other arrangements of data, possibly including associated metadata, as in an embodiment in which storage devices 112 store user data pages and metadata pages of LUNs or other logical storage volumes.

The storage devices 112 of the storage system 105 illustratively comprise solid state drives (SSDs). Such SSDs are implemented using non-volatile memory (NVM) devices such as flash memory. Other types of NVM devices that can be used to implement at least a portion of the storage devices 112 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in storage system 105 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the storage system 105 illustratively comprises a scale-out all-flash content addressable storage array such as an XtremIO™ storage array from Dell Technologies. A wide variety of other types of storage arrays can be used in implementing the storage system 105 in other embodiments, including by way of example one or more Unity™ or PowerMax™ storage arrays, each commercially available from Dell Technologies.

Additional or alternative types of storage products that can be used in implementing a given storage system in illustrative embodiments include, by way of example, software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to storage systems based on flash memory or other types of NVM storage devices. A given storage system as the term is broadly used herein can comprise, for example, network-attached storage (NAS), storage area networks (SANs), direct-attached storage (DAS) and distributed DAS, as well as combinations of these and other storage types, including software-defined storage.

The storage system 105 should also be understood to include additional modules and other components typically found in conventional implementations of storage systems, although such additional modules and other components are omitted from the figure for clarity and simplicity of illustration.

In some embodiments, communications between the host devices 102 and the storage system 105 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 102 to communicate with the storage system 105 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein in its entirety. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

As indicated previously, the host devices 102 and the storage system 105 may be implemented on respective distinct processing platforms, although numerous other arrangements are possible. For example, in some embodiments at least portions of the host devices 102 and the storage system 105 are implemented on the same processing platform. The storage system 105 can therefore be implemented at least in part within at least one processing platform that implements at least a portion of the host devices 102. In the FIG. 1 embodiment, storage system 105 is implemented as a distributed or clustered storage system comprising nodes 106 that may be logically or physically distributed.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and storage system 105 to reside in different data centers. Numerous other distributed implementations of one or both of the host devices 102 and the storage system 105 are possible. Accordingly, the storage system 105 can also be implemented in a distributed manner across multiple data centers.

Additional examples of processing platforms utilized to implement host devices and/or storage systems in illustrative embodiments will be described in more detail below in conjunction with FIGS. 6 and 7.

It is to be appreciated that the above-described features and other features of illustrative embodiments disclosed herein are presented by way of example only and should not be construed as limiting in any way.

The particular sets of modules and other components implemented in the system 100 as illustrated in FIG. 1 are therefore presented by way of illustrative example only. In other embodiments, only subsets of these components, or additional or alternative sets of components, may be used, and such components may exhibit alternative functionality and configurations.

Accordingly, different numbers, types and arrangements of system components such as host devices 102, network 104, storage system 105, nodes 106, processing devices 108, cores 110, storage devices 112, and datasets 114, or additional or alternative components, can be used in other embodiments.

Also, in some embodiments, functionality for synchronization object issue detection as disclosed herein can be implemented at least in part in one or more host devices, or partially in a host device and partially in a storage system. Accordingly, illustrative embodiments are not limited to arrangements in which all such functionality is implemented in a storage system, and therefore encompass various hybrid arrangements in which the functionality is distributed over one or more storage systems and one or more associated host devices, each comprising one or more processing devices.

Figure 2:
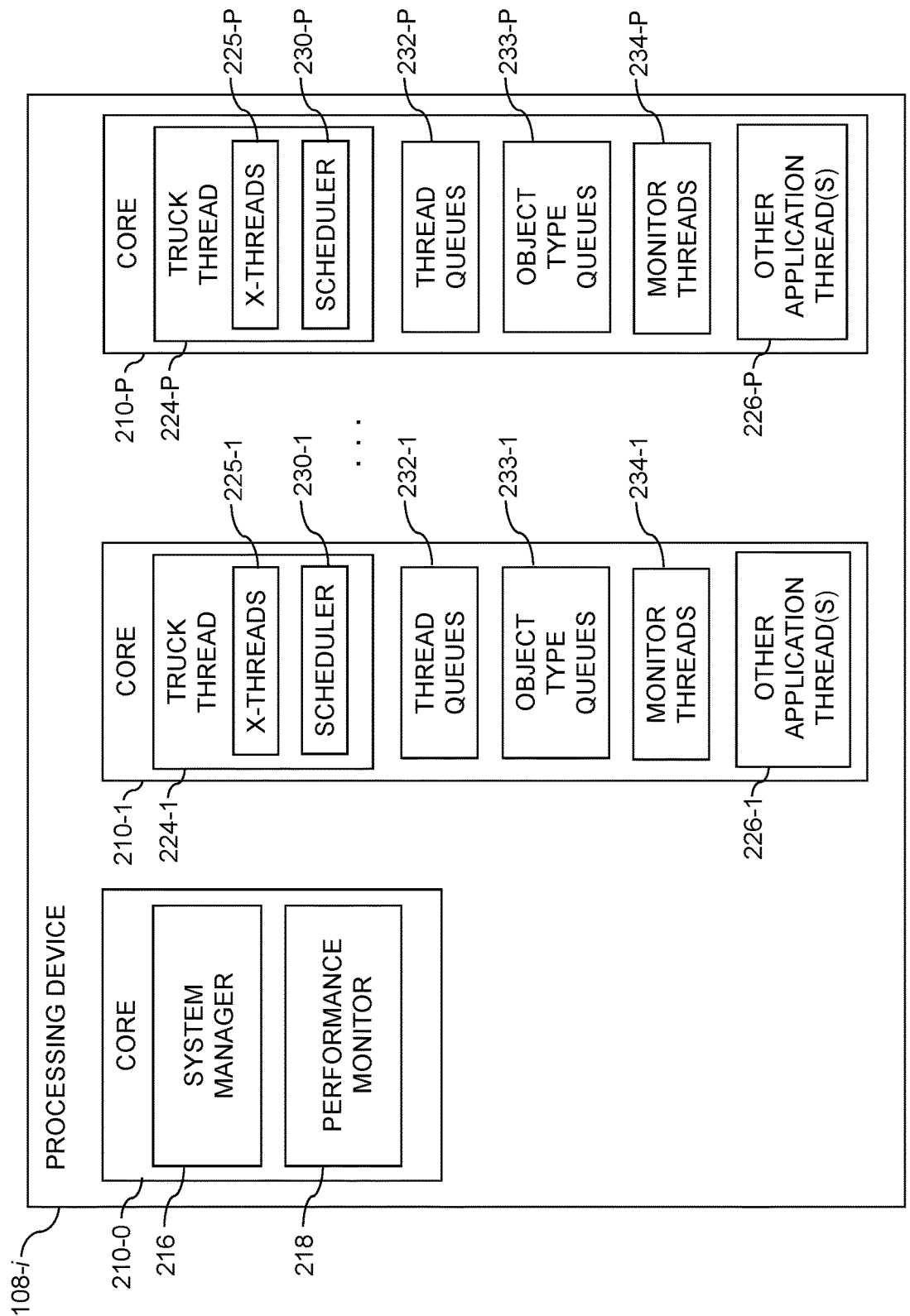
FIG. 2 is a block diagram of a processing device of the information processing system of FIG. 1 comprising a plurality of processing cores having respective sets of object type queues in an illustrative embodiment.

Referring now to FIG. 2, a given one of the processing devices 108, denoted as processing device 108-$i$, where i=1, 2, . . . M, is shown in more detail. The processing device 108-$i$ in this embodiment comprises a multi-core processor including processing cores 210-0, 210-1, . . . 210-P. The processing core 210-0 implements a system manager 216 and a performance monitor 218.

The other processing cores 210-1 through 210-P execute respective truck threads 224-1 through 224-P, comprising respective sets of multiple sub-threads illustratively in the form of X-threads 225-1 through 225-P. Other types of sub-threads can be used in other embodiments. The processing cores 210-1 through 210-P also execute respective sets of one or more other application threads 226-1 through 226-P. These and other threads illustratively comprise operating system (OS) threads of their respective cores 210.

For example, in the case of a block-storage application, which handles the block-based storage functionality of the storage system 105, the block-storage application executes truck threads 224 on respective ones of the cores 210 of the processing device 108-$i$. These truck threads 224 implement the block-storage application functionality. In some embodiments, each of the truck threads 224 may be hard affined to a particular one of the processing cores 210, such that it may only execute on that particular core.

The processing cores 210 in some embodiments illustratively comprise respective distinct central processing units (CPUs). Accordingly, each of the processing devices 108 of the respective nodes 106 of storage system 105 may be viewed as comprising a multi-core CPU and an associated storage array comprising a set of storage devices 112, although numerous other arrangements are possible. The storage array or other arrangement of storage devices 112 associated with a given one of the nodes 106 may comprise, for example, a disk array enclosure (DAE), although such references herein to "disks" should not be construed as an indication that the storage devices are limited to HDDs or other rotating magnetic storage media.

The above-noted multi-core CPU illustratively runs the block-storage application on top of a preemptive OS, where a preemptive OS can preempt (e.g., stop) a running OS thread without its cooperation, and execute something else, such as another OS thread. The block-storage application is illustratively running a single hard-affined OS thread per each CPU core, which implements the block-storage functionality. This OS thread is an example of what is also referred to herein as a "truck thread." Truck threads and other application threads running on a given CPU core or other processing core are more generally referred to herein as "core threads" of that processing core.

As part of its operation, each of the truck threads 224 polls a corresponding set of interfaces of the storage system 105 for tasks, events, or other data to be processed by that truck thread. For example, the set of interfaces may include an interface for indications of completions of submitted IO requests, an interface for IO requests from the user, and interfaces for other tasks, events, or other data. Any other interfaces may also be polled. Each truck thread, by design, fully utilizes the processing core that it is executing on for both interface polling and processing of the corresponding tasks, events, or other data. For example, in illustrative embodiments, each truck thread is designed to fully utilize the processing core that it is executing on because, even when there is no actual processing of tasks to be performed, the truck thread continues checking its respective interfaces via polling. This design is optimized for a storage system that requires low latency and high IO operations per second (IOPS) since no context switches or interrupts are required to perform the processing. In some embodiments, the functionality of the block-storage application may be described as an always-polling model.

In some embodiments, example interfaces that may be polled by a truck thread may include a front-end interface, a remote procedure call (RPC) messaging interface, a remote direct memory access (RDMA) messaging interface, and a back-end interface. In some embodiments, any other interface commonly used in a storage system may also be polled by the truck thread. In some embodiments, each truck thread defines an IO-provider instance for each corresponding interface that it is responsible for polling.

The front-end interface illustratively comprises an interface for receiving and replying to IO requests from users of the storage system 105 associated with respective ones of the host devices 102. For example, a given truck thread may comprise a front-end IO-provider instance that polls for new IO requests from one or more host devices 102 or other system users. In some embodiments, for example, IO requests received by the storage system 105 from the user are pooled together in a common pool that is shared between the truck threads 224 and accessed using a front-end IO-provider instance.

The RPC messaging interface illustratively comprises an interface for sending and receiving messages to and from other nodes 106 of the storage system 105. For example, a given truck thread may comprise an RPC messaging IO-provider that polls for new messages from other nodes 106 in the storage system 105. As an example, when one of the nodes 106 sends an IO request to another one of the nodes 106, the sender node selects the specific destination truck thread, that is, the truck thread that will receive and handle the request.

The RDMA messaging interface illustratively comprises an interface for RDMA transfer of buffers between nodes 106. For example, a given truck thread may comprise an RDMA messaging IO-provider that polls for the completion of RDMA transfers between nodes 106.

The back-end interface illustratively comprises an interface for accessing the storage devices 112 in order to write data to and read data from the storage devices 112. For example, a given truck thread may comprise a back-end IO-provider that polls for the completion of write and read requests initiated by the truck thread to one or more of the storage devices 112 of processing device 108-i.

In some cases, the storage system 105 may also implement one or more other applications aside from the block-storage application. For example, a file-storage application that provides a file interface to a user of the information processing system 100 may also be implemented by the storage system 105, for example, by executing corresponding other application threads 226 on one or more of the cores 210. In some cases, the block-storage application and the file-storage application, or any other application, may be implemented by the storage system 105 simultaneously, each with a different load that can dynamically change over time.

Since these applications are attempting to utilize the same set of processing cores 210 simultaneously, management of the available processing resources of these cores 210 between the applications can be challenging. For example, since the block-storage application is implemented by executing truck threads 224 on each of the processing cores 210 of each of the nodes 106, and these truck threads 224 can utilize the full capacity of those processing cores 210, little to no processing resources of the storage system 105 may be available for use by other application threads 226 of another application.

In some embodiments, if only the file-storage application is actively in use, such that no tasks, events, or other data are present for the truck threads 224 to process, the associated file threads may only be able to utilize a portion of the processing resources of a core, such as 50% or another percentage, where the remaining portion, such as the other 50% or another percentage, will be used by the truck threads 224 just for polling interfaces. In cases where the block-storage application is actively performing operations, the truck threads 224 will utilize a substantial portion of the processing resources of the cores, such as 90%, 95%, or even 100%, to both poll the interfaces and process any tasks, events, or other data found on those interfaces during the polling, which leaves little to no processing resources available on those cores for use by other applications such as a file-storage application.

Examples of storage systems that allow the full processing resources of a core to be available for use by other applications, even when a truck thread of a block-storage application is utilizing that core to support its functionality, are disclosed in U.S. Pat. No. 10,871,991, entitled "Multi-Core Processor in Storage System Executing Dedicated Polling Thread for Increased Core Availability," which is incorporated by reference herein in its entirety. This issued patent more particularly discloses a storage system that in one or more illustrative embodiments is able to dynamically adapt to the user operation patterns of multiple simultaneously implemented applications where, for example, one of the applications executes an always-polling model of functionality that consumes significant processing resources using the above-described truck threads.

Additionally, techniques are disclosed in the above-cited U.S. Pat. No. 10,871,991 for creating an event-driven storage system out of a storage system implementing the above-described always-polling model, through the use of a dedicated peek-poller thread. The dedicated peek-poller thread serves as a mechanism to allow for the sharing of the full resources of the other cores in a processing device between the two or more applications in a manner that dynamically matches the user operation pattern. For example, the dedicated peek-poller thread is executed on a core of the processing device and partially replaces the polling functionality of each of the truck threads executing on the other cores in the processing device, thereby freeing up the processing resources of those other cores that would otherwise be used by the truck threads for polling for use by other applications during times when the block-storage application is experiencing reduced activity.

However, a situation may arise where, for example, the block-storage application is utilizing the full resources of the processing cores 210 such that having a dedicated peek-poller thread executing on one of the cores 210 reduces the total amount of processing resources available to the block-storage application. For example, if there are ten cores available on the processing device 108-$i$, and one of the cores is executing a dedicated peek-poller thread, only nine of the cores or 90% of the processing resources of the processing device are available for use by the block-storage application.

U.S. Pat. No. 10,884,799, entitled "Multi-Core Processor in Storage System Executing Dynamic Thread for Increased Core Availability," also incorporated by reference herein in its entirety, discloses in illustrative embodiments dynamic truck threads that may be executed on the cores of a processing device. The function of each of the dynamic truck threads is modifiable between multiple operating modes such that the full processing resources of all of the cores of a processing device are available for use by a block-storage application during periods of time when the block-storage application is exhibiting high levels of core utilization while the processing resources of the cores are also available for other applications during periods of time when the block-storage application is exhibiting moderate to low levels of core utilization.

For example, in such embodiments, the function of a given dynamic truck thread is dynamically modifiable between an operating mode where the given dynamic truck thread performs the above-described truck thread functionality and an operating mode where the given dynamic truck thread performs at least some of the above-described peek-poller thread functionality. In some embodiments, the functionality of each of the dynamic truck threads may also be modified to an operating mode where all functions of the dynamic truck threads are disabled on the cores 210 of the processing device 108-$i$ such that the processing resources of the cores 210 are fully available for use by other applications, such as a file-storage application. Illustrative embodiments disclosed herein can utilize one or more of the techniques disclosed in the above-cited U.S. Pat. No. 10,871,991 and 10,884,799. For example, one or more of the truck threads 224 of FIG. 2 may be implemented as respective dynamic truck threads. However, it is to be appreciated that utilization of such techniques is not required in illustrative embodiments disclosed herein.

The processing cores 210 of the FIG. 2 embodiment can therefore execute threads of multiple applications, including truck threads 224 and other application threads 226. For example, in some embodiments, a block-storage application is implemented by executing truck threads 224 on respective ones of the cores 210, with each of the truck threads 224 implementing a corresponding portion of the block-storage application. As described above, by executing truck threads 224 on respective cores 210, a significant portion of the processing resources of each of the cores 210 is utilized for polling interfaces associated with its corresponding truck thread, and processing associated tasks, events or other data found on those interfaces, leaving little to no processing resources available on that core for executing the threads of other applications. Some embodiments address this issue through the use of dynamic truck threads executing on one or more of the processing cores 210.

Performance monitoring techniques are illustratively used in storage system 105 to monitor the performance of core threads, such as the truck threads 224 executing on respective ones of the processing cores 210.

In some embodiments, the processing device 108-$i$ of the storage system 105 is configured to implement performance monitoring functionality for core threads of the storage system 105, such as the truck threads 224 that include respective schedulers 230. One or more of the schedulers 230 can each include both an internal scheduler and an external scheduler, as disclosed in U.S. patent application Ser. No. 16/747,138, filed Jan. 20, 2020 and entitled "Performance Monitoring for Storage System with Core Thread Comprising Internal and External Schedulers," which is incorporated by reference herein in its entirety.

The performance monitor 218 is configured to monitor performance of threads executing on the processing cores 210, such as truck threads 224 and other application threads 226. Such performance monitoring in illustrative embodiments involves collecting performance measurements from respective ones of the core threads.

For example, in the FIG. 2 embodiment, the truck thread 224-1 is assumed to be part of a block-storage application executing on the processing core 210-1. The truck thread 224-1 comprises a scheduler 230-1, which as noted above may include an internal scheduler, illustratively configured to control switching between particular ones of the X-threads 225-1 of the truck thread 224-1, and an external scheduler, illustratively configured to control release of the processing core 210-1 by the truck thread 224-1 for use by at least one of the other application threads 226-1 of a second application different than the block-storage application. In some embodiments, the second application comprises a file-storage application, although references herein to block-storage applications and file-storage applications are considered non-limiting examples.

The performance monitor 218 illustratively gathers such performance measurements from the truck thread 224-1 and from other ones of the truck threads 224 executing on respective other ones of the cores 210, and provides such measurements to the system manager 216 for use in controlling configuration of the processing device 108-$i$ and its processing cores 210 and their associated threads 224 and 226. As mentioned previously, the truck thread 224-1 when executing on the processing core 210-1 is illustratively configured to utilize substantially all available processing resources of the processing core 210-1, such as about 90% or more of the available processing resources of that core, or another designated amount of the available processing resources. Other embodiments can combine at least portions of system manager 216 and performance monitor 218 into a single component implemented on one or more processing cores 210 of at least one of the processing devices 108.

As indicated above, the truck threads 224 run respective sets of X-threads 225. The X-threads 225 illustratively comprise respective lightweight threads that are scheduled by the schedulers 230 of the respective truck threads 224. For example, there may be thousands of X-threads 225 associated with each of the truck threads 224, with each of the X-threads 225 representing a specific flow or processing job (e.g., synchronous read/write, destage, RAID rebuild, defragmentation, and numerous others). The X-threads 225 in some embodiments are non-preemptive (e.g., cooperative), which means that one of the X-threads of a particular truck thread voluntarily gives up execution in order to allow another one of the X-threads of that truck thread to be scheduled. If an X-thread is doing a lengthy computational task (e.g., a task taking tens of microseconds), it should contain explicit yield and/or suspension calls, or implicit calls by waiting on synchronization objects.

It is assumed in some embodiments herein that each X-thread can be in one of multiple designated states at a particular point in time, including, for example, a running state, a ready state and a suspended state. In the running state, the X-thread is currently running. In the suspended state, the X-thread is waiting on a synchronization object (e.g., a lock, a semaphore, a timer, a barrier, a memory pool, a thread pool, etc.) In the ready state, the X-thread is ready to run, but waiting for the processing core (e.g., another X-thread is currently running).

The X-threads 225-1 are examples of what are more generally referred to herein as "sub-threads" of their corresponding truck thread 224-1. Other types of sub-threads having different arrangements of possible states can be used in other embodiments.

The X-threads 225-1 in some embodiments therefore comprise respective non-preemptive threads and the truck thread 224-1 is configured such that no X-thread in the running state is suspended to allow release of the processing core 210-1 by the truck thread 224-1 for use by the other application thread 226-1. Multiple suspensions of the truck thread 224-1 to allow the other application thread 226-1 to execute may therefore each occur in conjunction with a switch between X-threads 225-1 of the truck thread 224-1. As mentioned previously, the scheduling of the X-threads 225-1 is illustratively performed under the control of an internal scheduler in scheduler 230-1 of the truck thread 224-1.

In some embodiments, an external scheduler in scheduler 230 of the truck thread 224-1 comprises a processing core release component and a waker component. The processing core release component is configured to determine, in conjunction with each switch between X-threads 225-1 of the truck thread 224-1, whether or not the truck thread 224-1 will suspend itself so as to release the processing core 210-1 for use by at least another application thread 226-1 of the file-storage application. The processing core release component in some embodiments may be referred to as a CPU release component, as the processing cores such as cores 210 may comprise respective distinct CPUs of the processing device 108-1.

In some embodiments, the processing core release component of the truck thread 224-1 more particularly operates as follows. On every X-thread switch, a determination is made as to whether or not the truck thread 224-1 will give up execution, to allow other applications (e.g., a file-storage application) to run. When a truck thread suspends itself, it will resume execution when no other application is ready to run, or it will be rescheduled to run after a certain time by the waker component, whichever happens first.

The waker component is configured to determine, in conjunction with each switch between X-threads 225-1 of the truck thread 224-1, whether or not there is at least one additional thread of the block-storage application to be returned from suspension prior to release of the processing core 210-1 by the truck thread 224-1.

The waker component in some embodiments more particularly operates as follows. On every X-thread switch, and before the decision is made whether to give up the processing core, the waker component checks if there are currently one or more other truck threads of the block-storage application that are suspended and need to be awakened, and if so it wakes up the one or more other truck threads.

The processing core release component therefore illustratively operates in conjunction with the waker component to suspend the truck thread 224-1 and to return the truck thread 224-1 from suspension. Other arrangements of additional or alternative components can be included in the external scheduler of scheduler 230-1 in other embodiments.

Each of the other processing devices 108 is assumed to be similarly configured to processing device 108-1 as described above and elsewhere herein.

Performance monitoring functionality implemented in storage system 105 in some embodiments includes aspects of performance monitoring as disclosed in U.S. Pat. No. 10,152,232, entitled "Low-Impact Application-Level Performance Monitoring with Minimal and Automatically Upgradable Instrumentation in a Storage System," which is incorporated by reference herein in its entirety.

For example, U.S. Pat. No. 10,152,232 describes techniques for monitoring of storage system processing time dynamics at a flow level, in order to generate performance measurements that can be used for various purposes such as for the investigation and debugging of issues as well as for performance analysis of the storage system.

However, other performance monitoring techniques can be implemented in other embodiments, and illustrative embodiments should therefore not be viewed as being limited to use with any particular performance monitoring techniques, such as those disclosed in U.S. Pat. No. 10,152,232.

The manner in which a processing device 108-1 provides functionality for synchronization object issue detection using object type queues and associated monitor threads will now be described in more detail. Again, each of the other processing devices 108 is assumed to be configured in a manner similar to that described herein with regard to processing device 108-1. It is to be appreciated that in some embodiments, different synchronization object issue detection arrangements can be implemented in different ones of the processing devices 108 of the storage system 105.

In some embodiments, the threads of the one or more applications executing on at least one of the processing cores 210 comprise different X-threads 225 of one or more truck threads 224 of one or more applications executing on a particular one of the processing cores 210, such as processing core 210-1. For example, the one or more applications can comprise a block-storage application of the storage system 105 and the one truck threads can comprise truck thread 224-1 that when executing on the processing core 210-1 is configured to utilize substantially all available processing resources of that processing core (e.g., about 90% or more of the available processing resources of the processing core).

As indicated previously, each of the X-threads 225-1 of the truck thread 224-1 is illustratively in one of multiple designated states at a particular point in time, including a running state, a ready state and a suspended state. Other types and arrangements of states can be used in other embodiments.

Different ones of the X-threads 225-1 that are in the suspended state are illustratively enqueued in respective different ones of a plurality of thread queues 232-1, which is one set of the multiple sets of thread queues 232-1 through 232-P of the processing device 108-$i$, in order to wait for access to respective corresponding synchronization objects associated with resources of the processing core 210-1. The X-threads 225 of the other processing cores 210 may be similarly enqueued in the thread queues 232 of their respective processing cores 210 in order to wait for synchronization objects of those processing cores 210.

A given such synchronization object can include, for example, a lock. Other types of synchronization objects that can additionally or alternatively be implemented in storage system 105 in illustrative embodiments herein include, for example, a semaphore, a timer, a barrier, a memory pool and/or a thread pool, or various combinations of these and other synchronization objects. The term "synchronization object" as used herein is intended to be broadly construed, so as to encompass, for example, various types of storage system resources that can be held by one thread to the exclusion of one or more other threads. Different synchronization objects are illustratively associated with different ones of the thread queues 232-1, in which threads waiting for those synchronization objects are enqueued.

Figure 4:
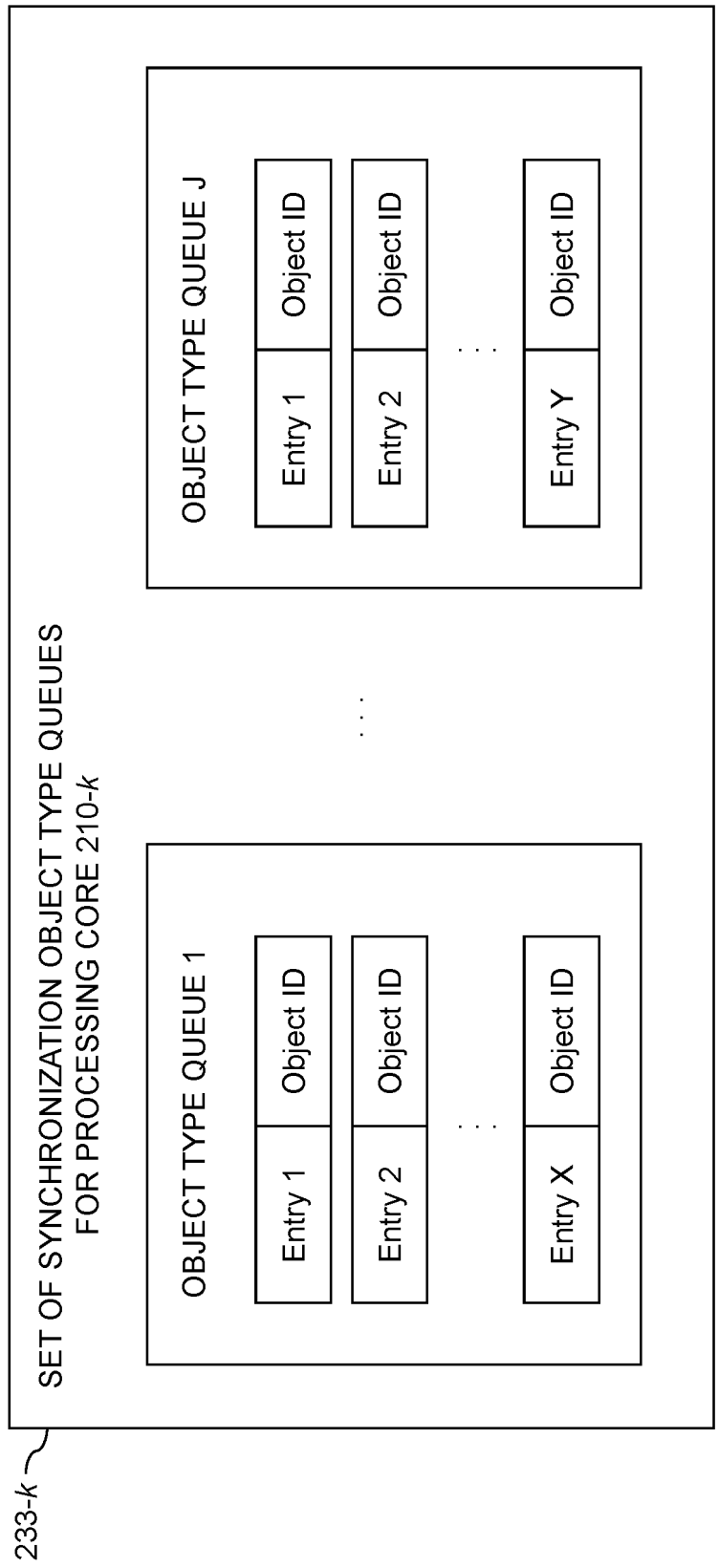
FIG. 4 shows an example of a set of object type queues within a given processing core in an illustrative embodiment.

In implementing synchronization object issue detection in some embodiments, the processing cores 210 utilize respective sets of object type queues 233-1 through 233-P and corresponding monitor threads 234-1 through 234-P in respective ones of the processing cores 210. An example of a set of object type queues 233-k in a particular one of the processing cores 210-k is shown in FIG. 4.

The processing core 210-1 of processing device 108-1 is illustratively configured to establish one or more groups of synchronization objects based at least in part on object type, and for each of the one or more groups, to insert entries into a corresponding one of the object type queues 233-1 for respective objects of the group, and to execute an associated one of the monitor threads 234-1 for the group.

The monitor thread is configured to scan the entries of the corresponding object type queue, and responsive to at least one of the scanned entries meeting one or more designated conditions, to take at least one automated action for its associated object.

In some embodiments, establishing one or more groups of synchronization objects based at least in part on object type comprises receiving registration information for a particular object type via an application programming interface (API), and establishing a group for the particular object type based at least in part on the registration information.

Different thresholds or other detection conditions are illustratively designated for use with different ones of the groups of synchronization objects.

In some embodiments, the monitor thread is configured to operate in accordance with a series of monitoring cycles. One or more objects added to the group in a given one of the monitoring cycles illustratively have corresponding entries inserted into an additional queue, referred to in some embodiments herein as a "changes queue" and not explicitly shown in FIG. 2. The entries inserted into the additional queue are subsequently merged into the object type queue for the group.

For example, the entries in the additional queue for the one or more objects added to the group in the given monitoring cycle are subsequently merged into the object type queue for the group in conjunction with completion of the given monitoring cycle and are monitored by the monitor thread via their entries in the object type queue in a next monitoring cycle.

Additionally or alternatively, one or more objects to be deleted from the group in a given one of the monitoring cycles illustratively have their respective entries marked as deleted in the object type queue in the given monitoring cycle and any entries so marked are removed from the object type queue by the monitor thread in conjunction with the scan of the entries of the object type queue.

In some embodiments, taking at least one automated action comprises executing a callback function specified for the group, with the callback function being specified for the group in conjunction with establishing the group for the object type.

Additionally or alternatively, taking at least one automated action may comprise at least one of generating an alert to at least one other thread, performing one or more diagnostic operations, and storing identifying information of at least one other thread holding the corresponding object.

Other types of automated actions or combinations of multiple such automated actions can be used.

More detailed examples of possible implementations of the synchronization object issue detection functionality in illustrative embodiments will now be described.

It is assumed in these embodiments that the processing device 108-1 supports synchronization objects between X-threads (on the same truck thread or on different truck threads), and that the synchronization objects include, for example, locks. When an X-thread holds such a lock, which may also be referred to as a "blocking" lock, other X-threads that try to take the lock will remain in the suspended state until the lock is released.

Each truck thread in some embodiments is illustratively running a specific "IO-Provider" X-thread for each interface it polls. The IO-Provider X-threads are called periodically to poll the interfaces. For example, a back-end IO-provider X-thread polls for completion of read/write requests initiated by the truck thread to a disk array of storage system 105.

The storage system 105 in some embodiments uses a RAID arrangement, such as a RAID 5 arrangement configured to protect against data loss in the case of a single drive failure, or a RAID 6 arrangement configured to protect against data loss in the case of two simultaneous drive failures. In such arrangements, data blocks and parity blocks are distributed across the multiple drives of the disk array in "stripes."

There are scenarios (e.g., bugs and other errors), where threads may take and hold a lock for a long time, causing other threads that may need the lock to wait. As a result, flows in the storage system may be prolonged causing system instability and may even result in a system crash. Sometimes, such scenarios may have a limited effect on the storage system and may be unnoticeable, however when multiple scenarios happen, the resulting delays adds up causing timeouts/errors, and at that time it gets very complicated to identify all the causing threads.

For example, a thread may hold a RAID stripe lock for too long, causing a client IO thread that wants to read a page located on the same stripe to wait until client timeout.

Existing alert mechanisms are based on time measurements inside the thread that is waiting for the lock so all the diagnostics are done after the fact, when the thread finally got the lock (if at all), and therefore the information about the holder of the lock is already lost.

In addition, there may be a large number (e.g., thousands) of synchronization objects, which makes it a very complex to understand system delays caused by the various described scenarios.

In some embodiments, a synchronization object issue detection mechanism is provided that more particularly detects irregular locking scenarios for different types of synchronization objects of potentially large number without any visible performance degradation. Such detection of irregular locking scenarios is an example of what is more generally referred to herein as "synchronization object issue detection."

Example mechanisms for detection of irregular locking scenarios in storage system 105 illustratively include at least a subset of the following features.

1. Registering of different object types. Each object type can have its own detection conditions/thresholds.

2. Support for adding and removing objects for monitoring at runtime.

3. A lockless monitoring function allowing support for thousands of objects without performance degradation.

4. Newly added objects will be merged at the end of a monitoring cycle, and will be monitored on the next one.

An illustrative embodiment includes an API that supports one or more of the following functions for establishing and otherwise managing groups of synchronization objects based at least in part on object type:

1. Register New Type: registers a new object type, provides one or more callback functions, and designates a particular monitoring cycle. A given callback function illustratively denotes at least one other thread or other system component that is to be notified of detected issues relating to the registered object type.

2. Add Object: adds the object to a temporary queue. The temporary queue will be merged to the main queue at the end of the next monitoring cycle.

3. Remove Object: removes an object from monitoring.

4. Enable/Disable Object Type: enables or disables the monitoring of all objects of the object type.

5. Enable/Disable: enables or disables all monitoring for all object types.

The operation of an example mechanism for detecting irregular locking scenarios in some embodiments is as follows.

1. On a new type registration, a specific Lock Monitor thread will be created for all the objects of this type. The Lock Monitor thread is an example of what is more generally referred to herein as a "monitor thread," and it is to be appreciated that other types of monitor threads having additional or alternative functionality can be used in other embodiments. The Lock Monitor thread will serially pass through all the objects queued in its corresponding object type queue and call the registered callback, which does the actual object-specific checks and diagnostics. This scan of the object type queue is lockless, so there is no performance degradation.

2. For performance, the Lock Monitor thread works with the queues in lockless mode, so all the operation of queuing/dequeuing entries is done in a two-phase mode, as follows:
   (a) Queueing new entry:
      (i) Entry is added to a separate "changes queue" (e.g., under a change lock).
      (ii) The Lock Monitor thread will merge the changes queue to the main queue at the end of each pass/round. The merge is illustratively done under the same change lock. The "main queue" is an example of what is more generally referred to herein as an "object type queue" and the "changes queue" is an example of what is more generally referred to herein as an "additional queue."
   (b) Dequeuing entry: It is completely lockless.
      (i) Client thread just marks the entry as deleted.
      (ii) The Lock Monitor thread when processing the entry marked as "deleted" will not call the callback for it, but will instead just remove it from the main queue.

It is possible in some embodiments that the same synchronization object type may be registered multiple times with different type instances, as another example of a synchronization object group.

Additionally or alternatively, the system may be configured such that the number of monitored objects in any object type queue cannot exceed a predefined limit. In embodiments with large numbers of locks to be monitored, additional object types can be defined.

The example mechanisms described above support adding/removing of objects at run-time, which makes such arrangements highly scalable to large numbers of synchronization objects of various types. For example, a lock pool where locks are allocated and deallocated at runtime from the pool may be added to monitoring when allocated and removed from monitoring when deallocated accordingly.

Some embodiments can generate reports, logs or other information identifying the threads that have held particular locks for more than a designated threshold amount of time. For example, such information can include an identifier of the holding thread and other related information, such as a call stack for the holding thread.

The detection mechanism in the examples above uses the Lock Monitor as an "external" thread that can monitor different synchronization objects and perform alerting and/or diagnosis when some X-thread is waiting too long for access to an object held by another thread.

Moreover, the detection mechanism in these examples can advantageously determine which thread holds the lock, and not just which thread is waiting for the lock. Such mechanisms are very useful in investigating, diagnosing and alleviating the particular conditions that lead to locks being held for excessive amounts of time, and can therefore provide improved system stability.

Also, such arrangements allow analysis of reports, logs or other information relating to lock holds and can therefore provide an indication that one or more storage system parameters require re-tuning, re-sizing and/or other adjustments (e.g., some lock-pool needs to be increased) to improve system performance.

Additionally or alternatively, the example mechanism may be used for monitoring time-based conditions. For example, the system may use fast drives that have a very short IO latency, however if the back-end IO-Provider thread is not executed frequently enough, an IO request may be completed by a given drive but waiting for the IO-Provider thread for a long time, so the system does not actually fully utilize the advantages of the drives.

The detection mechanism may also be used for monitoring the IO-Provider thread calling period, and generating an alert when that period exceeds a threshold.

The particular features of the illustrative examples described above for detecting irregular locking scenarios are illustrative only, and can be modified in a straightforward manner for use with other types of synchronization objects. Also, the particular advantages described above are present in some embodiments disclosed herein, but need not be present in other embodiments, and are therefore also non-limiting.

As indicated elsewhere herein, the processing of IO operations is illustratively distributed across a plurality of distinct storage nodes 106 of the storage system 105, with each of the storage nodes 106 including a different one of the processing devices 108 and a corresponding set of processing cores 210 of the storage system 105. In such an arrangement, the processing of a given one of a plurality of IO operations in the storage system 105 can involve generation of different threads on different ones of the storage nodes 106. More particularly, the processing of the given IO operation in the storage system 105 can be a very complex process that goes through many steps in multiple ones of storage nodes 106, with each such storage node running many different jobs involving different flows and components, with potentially large numbers of cross-dependencies.

As indicated previously, a given one of the X-threads 225-1 can be in different states at different times, including, for example, a running state, a suspended state and a ready state. When in the suspended state, the X-thread is illustratively queued in one of the thread queues 232-1. When in the ready state, the X-thread is illustratively queued in a ready queue of the scheduler 230-1.

The processing of a given IO operation is illustratively comprised of intervals of X-thread processing time and waiting time. The latter illustratively includes time spent in thread queues waiting for the above-noted synchronization objects, and/or RPC replies, disk acknowledgements, resource allocations, and so on.

Although some embodiments associate each synchronization object with a different thread queue, other arrangements are possible. For example, in some embodiments, at least a portion of the thread queues 232-1 may comprise prioritized thread queues, illustratively used for all or substantially all synchronization objects for which threads encounter significant waiting times, as disclosed in U.S. patent application Ser. No. 16/915,380, filed Jun. 29, 2020 and entitled "End-to-End Quality of Service Mechanism for Storage System Using Prioritized Thread Queues," which is incorporated by reference herein in its entirety.

An example implementation of a prioritized thread queue ("PrioThQ") provides flexible and distinct dequeuing policies for X-threads of a given IO operation based on assigned class of service (CoS) tags. For example, each of a plurality of different synchronization objects may have respective different PrioThQs associated therewith. The PrioThQ may be a generalization of a basic ThQ class, where ThQ denotes a single thread queue, illustratively a simple first-in first-out (FIFO) queue. The PrioThQ provides a generic basis for different prioritized synchronization objects, such as locks, semaphores, timers, barriers, memory pools, thread pools etc. The PrioThQ may be viewed as aggregation of several simple ThQs with a smart dequeuing policy for dequeuing threads from those multiple ThQs. It is to be appreciated that use of prioritized thread queues is not required, and may be eliminated in other embodiments. A wide variety of additional or alternative types of thread queues can be used as part of the thread queues 232-1 of the processing core 210-1.

Some embodiments therefore allow the above-noted single thread queue of a given synchronization object to be replaced with a prioritized thread queue of the type described above. This allows different prioritization policies to be provided for different threads that are waiting for this synchronization object, instead of the single thread queue arrangement without any prioritization.

Prioritized thread queues are illustratively used for all or substantially all synchronization objects for which threads encounter significant waiting times, and such determinations as to whether or not to utilize prioritized thread queues for certain synchronization objects can be made during development and/or testing of the storage system 105. For those synchronization objects that do not involve significant waiting times for their corresponding enqueued threads, prioritized thread queues need not be used.

In some embodiments, an example implementation of a PrioThQ operates in the following manner. Each IO operation that enters the storage system 105 is classified according to its attributes (e.g., application, user, storage volume, etc.) and is assigned an appropriate CoS tag based on the classification. If a particular IO operation cannot be classified, it may be assigned a default CoS tag. Such CoS tags are examples of what are more generally referred to herein as "class tags."

The assigned CoS tag is persistent for a given IO operation throughout its processing lifetime in the storage system 105. The assigned CoS tag is illustratively maintained as an X-thread attribute for any X-threads utilized in processing the IO operation.

As the processing of a given IO operation may involve multiple storage nodes 106, the assigned CoS tag is illustratively passed across the storage system 105 from a source storage node to a destination storage node as an RPC attribute and is used to tag a handling X-thread at the destination node. Multiple instances of such passing of the CoS tag between storage nodes may occur in processing the given IO operation. All X-threads utilized in processing the given IO operation will therefore have the same assigned CoS tag.

The PrioThQ in this example implementation provides flexible and distinct dequeuing policies for X-threads of a given IO operation based on the assigned CoS tags. For example, each of a plurality of different synchronization objects may have respective different PrioThQs associated therewith.

In some embodiments, the PrioThQ is a generalization of a basic ThQ class, where ThQ denotes a single thread queue, illustratively a simple FIFO queue. The PrioThQ provides a generic basis for different prioritized synchronization objects, such as locks, semaphores, timers, barriers, memory pools, thread pools etc. The PrioThQ may be viewed as aggregation of several simple ThQs with a smart dequeuing policy for dequeuing threads from those multiple ThQs.

The number of ThQs in a given PrioThQ is illustratively defined on PrioThQ creation. For example, this number may be defined by two parameters, namely, the number of priority classes and the number of round robin indexes. More particularly, the number of ThQs is illustratively equal to the product of the number of priority classes and the number of round robin indexes. Other techniques can be used to determine the number of ThQs within the given PrioThQ in other embodiments.

The priority class illustratively defines the priority or weight of the corresponding ThQ. The priority or weight of each ThQ is set during PrioThQ creation and may be changed at any time thereafter. The weights assigned to the different priority classes are illustratively defined in percentages or other measures. In the case of percentages, the sum of all priority class weights is 100%. For example, a priority class having an assigned weight of 20% means that 20 dequeue events out of every 100 dequeue events are guaranteed or reserved to the corresponding ThQs of that priority class. If all ThQs of this priority class are empty, an available scheduling slot will be passed to the next priority class.

An "out of order" priority class may be configured in some embodiments, with no other ThQs being served if any such "out of order" ThQ is not empty.

In some embodiments, all ThQs in the same priority class have the same priority. When it is the turn of a particular priority class to be scheduled, based on the weights assigned to the various priority classes, a specific ThQ inside the particular priority class is selected in accordance with a round robin policy using the round robin indexes, and a thread is dequeued from the specific selected ThQ.

This combination of priority class and round robin index in illustrative embodiments permits implementation of a wide variety of different dequeuing policies in a highly flexible manner.

Again, use of the above-described prioritized thread queues is not required in illustrative embodiments herein. Other types of thread queues, including various combinations of non-prioritized thread queues and prioritized thread queues, can be used as thread queues 232 in the processing cores 210.

In some embodiments, each of the processing devices 108 incudes its own system manager 216 and performance monitor 218. However, in other embodiments, it is possible that such components are implemented on only one of the processing devices 108, or on other subsets of the processing devices 108, in which case a system manager 216 and performance monitor 218 implemented on one of the processing devices 108 may provide similar system management and performance monitoring functionality for one or more other ones of the processing devices 108. It is therefore possible that one or more of the processing devices 108 may not include its own instances of system manager 216 and/or performance monitor 218. Also, although system manager 216 and performance monitor 218 are illustratively shown as executing on a separate core 210-0 in this embodiment, this is by way of example only, and in other embodiments, one or more of these components may each be distributed over multiple ones of the cores 210.

In some embodiments, storage system 105 may comprise a separate processing device that executes the system manager 216 and manages the truck threads 224 executing on the cores 210 of the processing devices 108 of the nodes 106.

Accordingly, in some embodiments, the execution and implementation of system manager 216 and/or performance monitor 218 may be distributed across multiple cores 210, processing devices 108, and/or nodes 106.

In some embodiments, the system manager 216 and performance monitor 218 collectively monitor the core utilization of one or more of the processing devices 108 and may dynamically control and change the modes in which the truck threads 224 and other application threads 226 operate in order to adapt the storage system 105 to actual usage patterns of the users associated with the host devices 102.

These and other embodiments can utilize various techniques for disabling and re-enabling threads, including those disclosed in U.S. Pat. No. 10,474,496, entitled "Dynamic Multitasking for Distributed Storage Systems by Detecting Events for Triggering a Context Switch," which is incorporated by reference herein in its entirety.

The operation of the information processing system 100 will now be described in further detail with reference to the flow diagram of the illustrative embodiment of FIG. 3. The process as shown in FIG. 3 includes steps 300 through 306, and is suitable for use in system 100 but is more generally applicable to other types of information processing systems in which a storage system is configured to implement functionality for synchronization object issue detection of the type disclosed herein.

Figure 3:
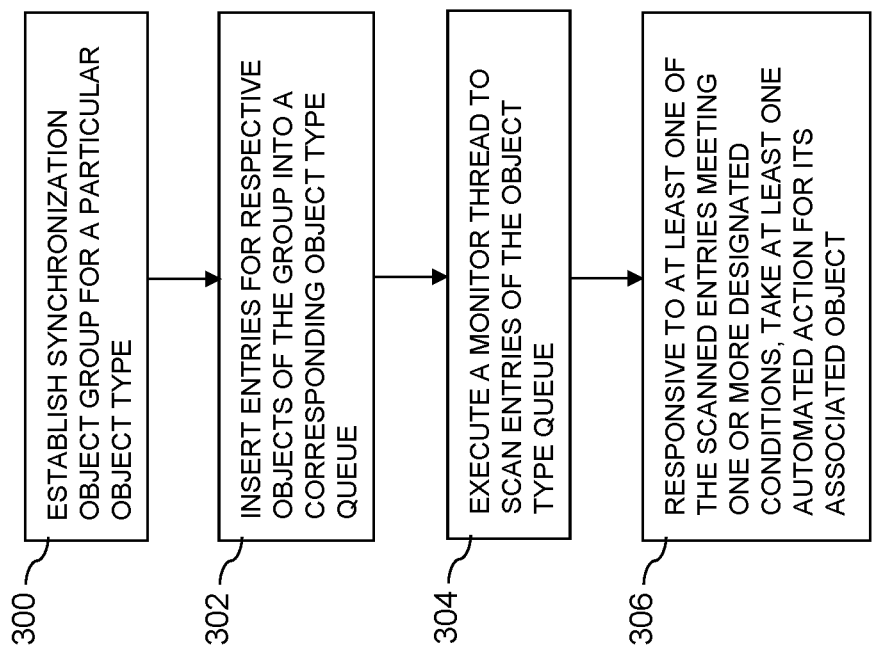
FIG. 3 is a flow diagram of an example process providing functionality for synchronization object issue detection in an illustrative embodiment.

The steps of FIG. 3 are illustratively performed at least in part under the control of one or more processing devices 108 of one or more nodes 106 in storage system 105 of system 100. For example, in some embodiments, the steps of FIG. 3 may be performed under the control of system manager 216 executing on processing device 108-i of a corresponding one of the nodes 106 of the storage system 105. Some or all of the steps may be performed asynchronously relative to one another rather than serially as illustrated in the figures. Also, multiple instances of the process can be performed at least in part in parallel to one another for different truck threads or other block-storage threads of different processing cores of processing device 108-i. It is further assumed that each of the other processing devices 108 executes similar processes for synchronization object issue detection using object type queues 233 and associated monitor threads 234 for synchronization objects utilized by truck threads 224 and possibly other application threads 226 of their respective processing cores 210.

In step 300, a synchronization object group is established for a particular object type in a storage system. For example, the synchronization object group can be established based at least in part on registration information received for a particular object type via an API or other interface.

Although this step refers to establishment of a single group for a particular object type, the storage system can multiple distinct groups of synchronization objects in a storage system based at least in part on object type. Different detection thresholds, criteria or other types of detection conditions are illustratively designated for use with different ones of the groups of synchronization objects.

In some embodiments, the synchronization objects comprise respective distinct locks in the storage system, where a given such lock is illustratively held by a first thread at a particular point in time while one or more other threads are waiting to obtain access to the lock held by the first thread. Other examples of synchronization objects that can be used in some embodiments herein include a semaphore, a timer, a barrier, a memory pool and a thread pool. As indicated above, the term "synchronization object" as used herein is intended to be broadly construed, so as to encompass, for example, various types of storage system resources that can be held by one thread to the exclusion of one or more other threads. The term "object type" as used herein is also intended to be broadly construed, so as to encompass, for example, a particular category of synchronization objects, or to certain synchronization objects that have particular shared characteristics.

In step 302, entries for respective objects of the group are inserted into a corresponding object type queue.

In step 304, a monitor thread is executed to scan entries of the object type queue. The monitor thread may be created in conjunction with the establishment of the synchronization object group in step 300, and may perform additional functionality beyond scanning the entries of the object type queue. For example, the monitor thread in some embodiments can add entries for respective objects of the group into the object type queue in step 302. It can also delete entries from the object type queue. Accordingly, the term "monitor thread" as used herein is intended to be broadly construed.

In some embodiments, the monitor thread is configured to operate in accordance with a series of monitoring cycles, and one or more objects added to the group in a given one of the monitoring cycles have corresponding entries inserted into an additional queue. The entries inserted into the additional queue are subsequently merged into the object type queue for the group, and monitored by the monitor thread via their entries in the object type queue in a next monitoring cycle. Additionally or alternatively, one or more objects to be deleted from the group in a given one of the monitoring cycles illustratively have their respective entries marked as deleted in the object type queue in the given monitoring cycle, and any entries so marked are removed from the object type queue by the monitor thread in conjunction with the scan of the entries of the object type queue. Such operations modify the contents of the object type queue relative to its initial entries as inserted in step 302.

In step 306, responsive to at least one of the scanned entries meeting one or more designated conditions, at least one automated action is taken for its associated object. For example, taking at least one automated action can include executing a callback function specified for the group. The callback function may be specified for the group in conjunction with establishing the group for the object type in step 300. In some embodiments, executing a callback function can include generating a notification to at least one other thread or other system component. Other types of notifications or related actions can be implemented responsive to a detected issue for the group, and the term "callback function" as used herein is therefore intended to be broadly construed. Additional or alternative types of automated actions that may be taken include, for example, generating an alert to at least one other thread, performing one or more diagnostic operations, and storing identifying information of at least one other thread holding the corresponding object.

It should be noted that the steps of the FIG. 3 process are exemplary only, and in other embodiments, additional or alternative steps can be used, and the order of the step execution can be altered from that shown in the figure. For example, certain steps shown as being performed serially in the figure can be performed at least in part in parallel with one another, or in a different order altogether. As a more particular example, execution of the monitor thread in step 304 can begin at an earlier point in the process, such as in conjunction with establishment of the synchronization object group for the object type in step 300, or in conjunction with inserting initial entries into the object type queue in step 302. In the latter case, the monitor thread can include functionality for adding one or more such entries, and possibly also for subsequently deleting one or more such entries. The term "monitor thread" as used herein is therefore intended to be broadly construed, and should not be viewed as being limited to a thread that performs only monitoring operations.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller comprising at least a portion of each of one or more of the processing devices 108 of storage system 105 and configured to control performance of one or more steps of the process of FIG. 3 in system 100 can be implemented as part of what is more generally referred to herein as a processing platform comprising one or more processing devices each comprising a processor coupled to a memory. A given such storage controller may correspond to one or more virtual machines or other types of virtualization infrastructure such as Docker containers or Linux containers (LXCs). The storage controller, as well as other system components, may be implemented at least in part using processing devices of such processing platforms. For example, in a distributed implementation, respective distributed modules of such a storage system 105 can be implemented in respective containers running on respective ones of the processing devices of a processing platform.

FIG. 4 shows an example set of object type queues 233-$k$ for a given processing core 210-$k$, where k=1, 2, . . . P. Similar sets of object type queues 233 can be implemented for each of the processing cores 210. In this embodiment, the set of object type queues 233-$k$ for processing core 210-$k$ comprises J distinct object type queues denoted Object Type Queue 1, . . . Object Type Queue J, each associated with a different synchronization object group, where the groups are established based at least in part on object type. As indicated previously, an object type in some embodiments refers to a particular category of synchronization objects, or to certain synchronization objects that have particular shared characteristics. Different object type queues are illustratively established for each of a plurality of such distinct synchronization object types, and each such object type queue is associated with a different one of the monitor threads 234-$k$ which is used to scan the entries of that object type queue and to perform other related functionality such as triggering one or more automated actions.

Object Type Queue 1 incudes a plurality of entries denoted Entry 1, Entry 2, . . . Entry X, each including a different object identifier ("Object ID") that uniquely specifies a particular synchronization object within the group established for the first object type. Similarly, Object Type Queue J incudes a plurality of entries denoted Entry 1, Entry 2, . . . Entry Y, each including a different Object ID that uniquely specifies a particular synchronization object within the group established for the J-th object type. Entries are added to and removed from the object type queues in conjunction with a monitoring cycle of their respective corresponding monitor threads, as described elsewhere herein.

It is to be appreciated that the particular features of FIG. 4, and those of other illustrative embodiments, are presented by way of example only, and should not be construed as limiting in any way.

In some embodiments, a storage system comprises a distributed content addressable storage (CAS) system configured to support synchronization object issue detection using object type queues and associated monitor threads as disclosed herein. A distributed CAS system is also referred to herein as a clustered CAS system. A "distributed CAS system" as that term is broadly used herein includes any CAS system that is distributed across multiple storage nodes, such as the nodes 106 of storage system 105.

An illustrative embodiment of such a CAS system will now be described with reference to FIG. 5. In this embodiment, a CAS system 505 comprises a plurality of storage devices 506 and an associated storage controller 508. The CAS system 505 may be viewed as a particular implementation of the storage system 105, and accordingly is assumed to be coupled to host devices 102 via network 104 in system 100.

The storage controller 508 in the present embodiment is configured to support synchronization object issue detection using object type queues and associated monitor threads of the type previously described in conjunction with FIGS. 1 through 4. For example, the CAS system 505 illustratively interacts with one or more host devices 102 to support performance of a process such as that shown in FIG. 3, in order to provide sets of object thread queues of the type shown in FIG. 4 for core threads executing on processing cores of the storage controller 508 in the CAS system 505.

The storage controller 508 includes distributed modules 516 and 518, which are configured to operate in a manner similar to that described above for respective system manager 216 and performance monitor 218 of the processing device 108-$i$ of system 100. Module 516 is more particularly referred to as distributed system management logic, and illustratively comprises multiple system management logic instances on respective ones of a plurality of distinct nodes, with the multiple system management logic instances collectively supporting synchronization object issue detection using object type queues and associated monitor threads as disclosed herein. Module 518 more particularly comprises distributed performance monitoring logic with different instances thereof also being implemented on respective ones of the distinct nodes. Such performance monitoring logic can interact with monitor threads in support of the synchronization object issue detection functionality disclosed herein.

Figure 5:
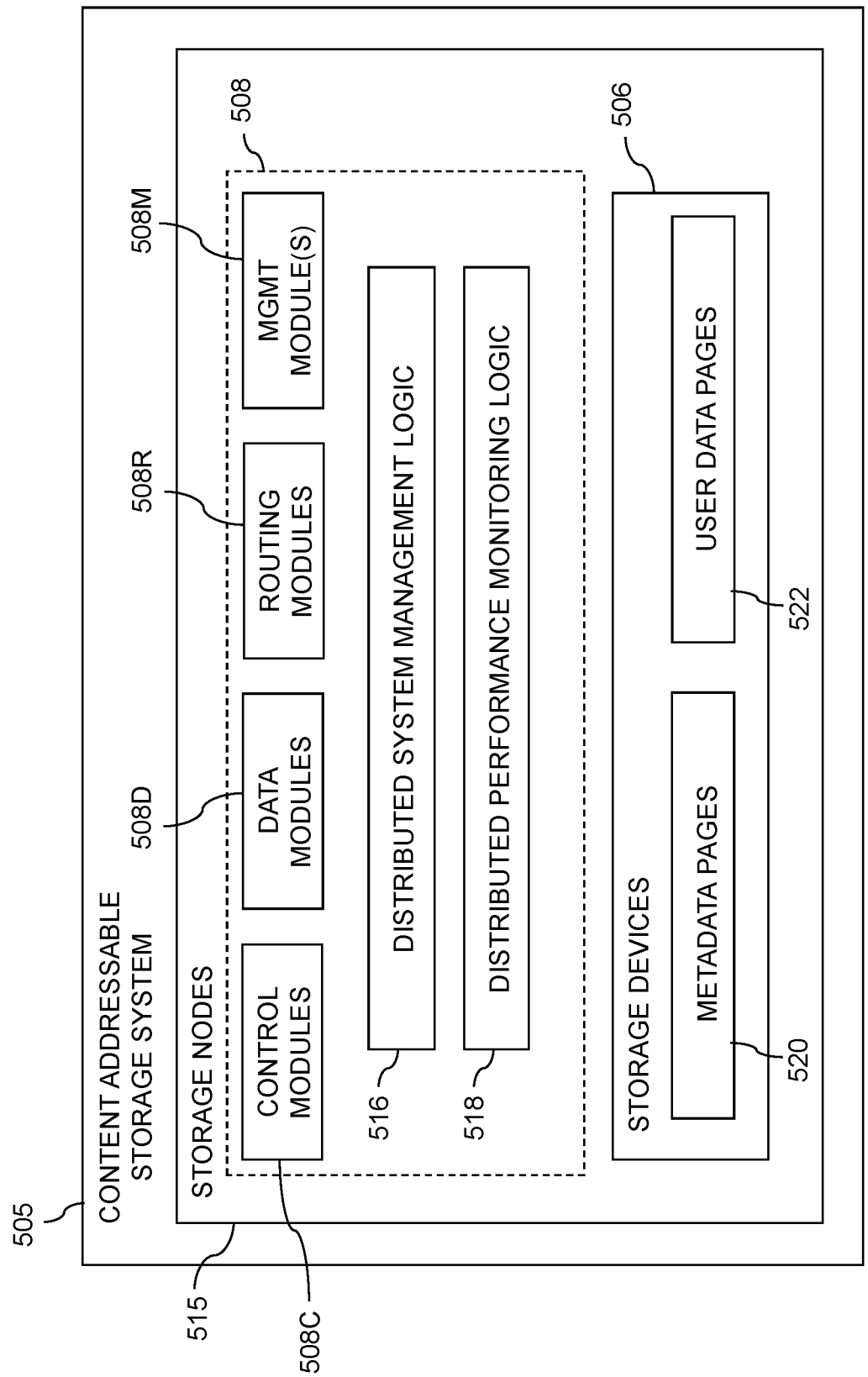
FIG. 5 shows a content addressable storage system having a distributed storage controller configured for implementing functionality for synchronization object issue detection in an illustrative embodiment.

The CAS system 505 in the FIG. 5 embodiment is implemented as a distributed storage system and illustratively includes a plurality of storage nodes 515 each comprising a corresponding subset of the storage devices 506. Such storage nodes 515 are examples of the "distinct nodes" referred to above, and other distributed or clustered storage system arrangements comprising multiple storage nodes and possibly additional or alternative nodes can be used in other embodiments. A given distributed or clustered storage system may therefore include not only storage nodes 515 but also additional storage nodes, compute nodes or other types of nodes coupled to network 104. Alternatively, such additional storage nodes may be part of another distributed or clustered storage system of the system 100. Each of the storage nodes 515 of the CAS system 505 is assumed to be implemented using at least one processing device comprising a processor coupled to a memory.

The storage controller 508 of the CAS system 505 is implemented in a distributed manner so as to comprise a plurality of distributed storage controller components implemented on respective ones of the storage nodes 515. The storage controller 508 is therefore an example of what is more generally referred to herein as a "distributed storage controller." In subsequent description herein, the storage controller 508 is referred to as distributed storage controller 508.

Each of the storage nodes 515 in this embodiment further comprises a set of processing modules configured to communicate over one or more networks with corresponding sets of processing modules on other ones of the storage nodes 515. The sets of processing modules of the storage nodes 515 collectively comprise at least a portion of the distributed storage controller 508 of the CAS system 505.

The modules of the distributed storage controller 508 in the present embodiment more particularly comprise different sets of processing modules implemented on each of the storage nodes 515. The set of processing modules of each of the storage nodes 515 comprises at least a control module 508C, a data module 508D and a routing module 508R. The distributed storage controller 508 further comprises one or more management ("MGMT") modules 508M. For example, only a single one of the storage nodes 515 may include a management module 508M. It is also possible that management modules 508M may be implemented on each of at least a subset of the storage nodes 515. A given set of processing modules implemented on a particular one of the storage nodes 515 therefore illustratively includes at least one control module 508C, at least one data module 508D and at least one routing module 508R, and possibly a management module 508M.

Communication links may be established between the various processing modules of the distributed storage controller 508 using well-known communication protocols such as TCP/IP and RDMA. For example, respective sets of IP links used in data transfer and corresponding messaging could be associated with respective different ones of the routing modules 508R.

Although shown as separate modules of the distributed storage controller 508, the modules 516 and 518 in the present embodiment are assumed to be distributed at least in part over at least a subset of the other modules 508C, 508D, 508R and 508M of the storage controller 508. Accordingly, at least portions of the storage system functionality of the modules 516 and 518 may be implemented in one or more of the other modules of the storage controller 508. In other embodiments, the modules 516 and 518 may be implemented as stand-alone modules of the storage controller 508.

The storage devices 506 are configured to store metadata pages 520 and user data pages 522, and may also store additional information not explicitly shown such as checkpoints and write journals. The metadata pages 520 and the user data pages 522 are illustratively stored in respective designated metadata and user data areas of the storage devices 506. Accordingly, metadata pages 520 and user data pages 522 may be viewed as corresponding to respective designated metadata and user data areas of the storage devices 506.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 520 and the user data pages 522.

The user data pages 522 are part of a plurality of LUNs configured to store files, blocks, objects or other arrangements of data, each also generally referred to herein as a "data item," on behalf of users of the CAS system 505. Each such LUN may comprise particular ones of the above-noted pages of the user data area. The user data stored in the user data pages 522 can include any type of user data that may be utilized in the system 100. The term "user data" herein is therefore also intended to be broadly construed.

A given storage volume for which content-based signatures are generated in the CAS system 505 illustratively comprises a set of one or more LUNs, each including multiple ones of the user data pages 522 stored in storage devices 506.

The CAS system 505 in the embodiment of FIG. 5 is configured to generate hash metadata providing a mapping between content-based digests of respective ones of the user data pages 522 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 522. The hash metadata generated by the CAS system 505 is illustratively stored as metadata pages 520 in the metadata area. The generation and storage of the hash metadata is assumed to be performed under the control of the storage controller 508.

Each of the metadata pages 520 characterizes a plurality of the user data pages 522. For example, in a given set of n user data pages representing a portion of the user data pages 522, each of the user data pages is characterized by a LUN identifier, an offset and a content-based signature. The content-based signature is generated as a hash function of content of the corresponding user data page. Illustrative hash functions that may be used to generate the content-based signature include the well-known SHA1 secure hashing algorithm, or other secure hashing algorithms known to those skilled in the art, including SHA2, SHA256 and many others. The content-based signature is utilized to determine the location of the corresponding user data page within the user data area of the storage devices 506.

Each of the metadata pages 520 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 520 in an illustrative embodiment comprises metadata pages having respective signatures. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the CAS system 505 is illustratively distributed among the control modules 508C.

The storage system functionality provided at least in part by modules 516 and 518 in this embodiment is assumed to be distributed across multiple distributed processing modules, including at least a subset of the processing modules 508C, 508D, 508R and 508M of the distributed storage controller 508.

For example, the management module 508M of the storage controller 508 may include a system management logic instance that engages corresponding system management logic instances in all of the control modules 508C and routing modules 508R in order to support synchronization object issue detection using object type queues and associated monitor threads as disclosed herein, as well as other related storage system functionality, within the CAS system 505.

In some embodiments, each user data page has a fixed size such as 8 KB and its content-based signature is a 20-byte signature generated using the SHA1 secure hashing algorithm. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," each incorporated by reference herein in its entirety.

The distributed storage controller 508 in this example is configured to group consecutive pages into page groups, to arrange the page groups into slices, and to assign the slices to different ones of the control modules 508C. For example, if there are 1024 slices distributed evenly across the control modules 508C, and there are a total of 16 control modules in a given implementation, each of the control modules "owns" 1024/16=64 slices. In such arrangements, different ones of the slices are assigned to different ones of the control modules 508C such that control of the slices within the storage controller 508 of the CAS system 505 is substantially evenly distributed over the control modules 508C of the distributed storage controller 508.

The data modules 508D allow a user to locate a given user data page based on its signature. Each metadata page also has a size of 8 KB and includes multiple instances of the <lun_id, offset, signature> for respective ones of a plurality of the user data pages. Such metadata pages are illustratively generated by the control modules 508C but are accessed using the data modules 508D based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the data module.

This metadata page will include the <lun_id, offset, signature> for the user data page if the user page exists. The signature of the user data page is then used to retrieve that user data page, also via the data module.

Write requests processed in the CAS system 505 each illustratively comprise one or more IO operations directing that at least one data item of the CAS system 505 be written to in a particular manner. A given write request is illustratively received in the CAS system 505 from a host device over a network. In some embodiments, a write request is received in the distributed storage controller 508 of the CAS system 505, and directed from one processing module to another processing module of the distributed storage controller 508. For example, a received write request may be directed from a routing module 508R of the distributed storage controller 508 to a particular control module 508C of the distributed storage controller 508. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In some embodiments, the control modules 508C, data modules 508D and routing modules 508R of the storage nodes 515 communicate with one another over a high-speed internal network such as an InfiniBand network. The control modules 508C, data modules 508D and routing modules 508R coordinate with one another to accomplish various IO processing tasks.

The write requests from the host devices identify particular data pages to be written in the CAS system 505 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The processing modules of distributed storage controller 508 as disclosed herein utilize metadata structures that include logical layer and physical layer mapping tables to be described below. It is to be appreciated that these particular tables are only examples, and other tables or metadata structures having different configurations of entries and fields can be used in other embodiments. The logical layer and physical layer mapping tables in this embodiment illustratively include the following:

1. An address-to-hash ("A2H") table. The A2H table comprises a plurality of entries accessible utilizing logical addresses as respective keys, with each such entry of the A2H table comprising a corresponding one of the logical addresses, a corresponding one of the hash handles, and possibly one or more additional fields.

2. A hash-to-data ("H2D") table that illustratively comprises a plurality of entries accessible utilizing hash handles as respective keys, with each such entry of the H2D table comprising a corresponding one of the hash handles, a physical offset of a corresponding one of the data pages, and possibly one or more additional fields.

3. A hash metadata ("HMD") table illustratively comprising a plurality of entries accessible utilizing hash handles as respective keys. Each such entry of the HMD table comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. The HMD table illustratively comprises at least a portion of the same information that is found in the H2D table. Accordingly, in other embodiments, those two tables can be combined into a single table, illustratively referred to as an H2D table, an HMD table or another type of physical layer mapping table providing a mapping between hash values, such as hash handles or hash digests, and corresponding physical addresses of data pages.

4. A physical layer based ("PLB") table that illustratively comprises a plurality of entries accessible utilizing physical offsets as respective keys, with each such entry of the PLB table comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length.

Again, the logical layer and physical layer mapping tables referred to above are examples only, and can be varied in other embodiments. For example, other types of hash-to-physical ("H2P") mapping tables may be used in addition to or in place of the above-noted HMD and PLB tables.

In some embodiments, certain ones of the above-described mapping tables are maintained by particular modules of distributed storage controller 508. For example, the mapping tables maintained by the control modules 508C illustratively comprise at least one A2H table and possibly also at least one H2D table. The A2H tables are utilized to store address-to-hash mapping information and the H2D tables are utilized to store hash-to-data mapping information, in support of mapping of logical addresses for respective pages to corresponding physical addresses for those pages via respective hashes or other types of content-based signatures, as described in further detail elsewhere herein.

The CAS system 505 utilizes a two-level mapping process to map logical block addresses to physical block addresses. The first level of mapping uses an A2H table and the second level of mapping uses an HMD table, with the A2H and HMD tables corresponding to respective logical and physical layers of the content-based signature mapping within the CAS system 505. The HMD table or a given portion thereof in some embodiments disclosed herein is more particularly referred to as an H2D table, although it is to be understood that these and other mapping tables or other data structures referred to herein can be varied in other embodiments.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 506. This is also referred to as physical layer mapping.

Examples of these and other metadata structures utilized in illustrative embodiments were described above. These particular examples illustratively include respective A2H, H2D, HMD and PLB tables. In some embodiments, the A2H and H2D tables are utilized primarily by the control modules 508C, while the HMD and PLB tables are utilized primarily by the data modules 508D.

For a given write request, hash metadata comprising at least a subset of the above-noted tables is updated in conjunction with the processing of that write request.

The A2H, H2D, HMD and PLB tables described above are examples of what are more generally referred to herein as "mapping tables" of respective distinct types. Other types and arrangements of mapping tables or other content-based signature mapping information may be used in other embodiments.

Such mapping tables are still more generally referred to herein as "metadata structures" of the CAS system 505. It should be noted that additional or alternative metadata structures can be used in other embodiments. References herein to particular tables of particular types, such as A2H, H2D, HMD and PLB tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the CAS system 505 correspond to respective physical blocks of a physical layer of the CAS system 505. The user data pages of the logical layer are organized by LBA and have reference via respective content-based signatures to particular physical blocks of the physical layer.

Each of the physical blocks has an associated reference count that is maintained within the CAS system 505. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 508C, 508D, 508R and 508M as shown in the FIG. 5 embodiment is presented by way of example only. Numerous alternative arrangements of processing modules of a distributed storage controller may be used to implement functionality for synchronization object issue detection using object type queues and associated monitor threads in a distributed storage system in other embodiments.

Additional examples of content addressable storage functionality implemented in some embodiments by control modules 508C, data modules 508D, routing modules 508R and management module(s) 508M of distributed storage controller 508 can be found in U.S. Pat. No. 9,104,326, entitled "Scalable Block Data Storage Using Content Addressing," which is incorporated by reference herein in its entirety. Alternative arrangements of these and other storage node processing modules of a distributed storage controller in a CAS system can be used in other embodiments.

Illustrative embodiments of a storage system with functionality for synchronization object issue detection as disclosed herein can provide a number of significant advantages relative to conventional arrangements.

For example, illustrative embodiments disclosed herein are advantageously configured to facilitate detection of irregular locking scenarios and other types of synchronization object issues in a storage system in which one or more processing cores of the storage system are used to execute multiple threads of one or more applications.

Additionally or alternatively, some embodiments disclosed herein are advantageously configured to support improved diagnostics for performance issues relating to synchronization object holds in a primary storage application executing on a processing core.

These and other embodiments advantageously provide a uniform, flexible and extensible framework for monitoring of synchronization objects in a storage system. Such arrangements are highly scalable to very large numbers of synchronization objects of different types, can be dynamically adjusted by adding and/or removing objects from an object type group at run-time, and provide improved system stability and performance.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and/or storage systems incorporating or otherwise supporting functionality for synchronized object issue detection using object type queues and associated monitor threads will now be described in greater detail with reference to FIGS. 6 and 7. Although described in the context of information processing system 100, these processing platforms may also be used to implement at least portions of other information processing systems in other embodiments.

Figure 6:
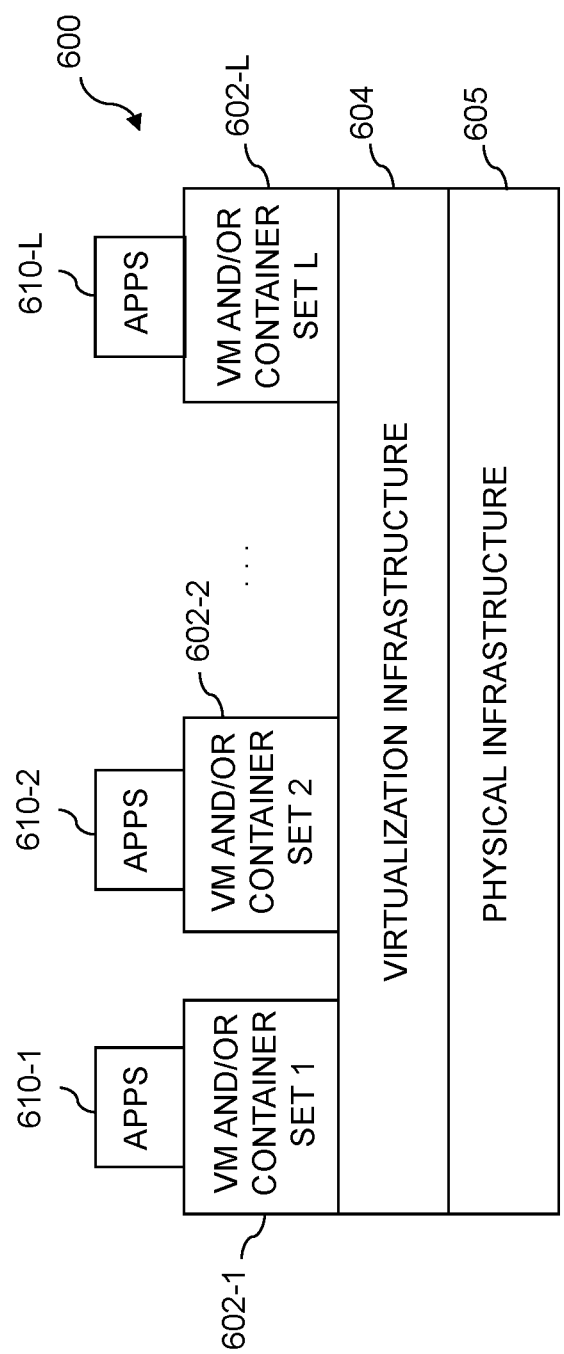

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide or otherwise utilize object type queues and associated monitor threads for groups of synchronization objects in a storage system of the type described above using one or more processes running on a given one of the VMs. For example, each of the VMs can implement at least portions of one or more synchronization object issue detection mechanisms using object type queues and associated monitor threads in the storage system 105 of system 100.

A hypervisor platform may be used to implement a hypervisor within the virtualization infrastructure 604. Such a hypervisor platform may comprise an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide or otherwise utilize object type queues and associated monitor threads for groups of synchronization objects in a storage system of the type described above. For example, a container host device supporting multiple containers of one or more container sets can implement at least portions of one or more synchronization object issue detection mechanisms using object type queues and associated monitor threads in the storage system 105 of system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network such as a 4G or 5G network, a wireless network such as a WiFi or WiMAX network, or various portions or combinations of these and other types of networks.

The processing device 702-1 in the processing platform 700 comprises a processor 710 coupled to a memory 712.

The processor 710 may comprise a single-core or multi-core CPU, a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, or VxBlock™ converged infrastructure from Dell Technologies.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of functionality for synchronization object issue detection as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, processing cores, threads, schedulers, applications, system management logic instances, performance monitoring logic instances, thread queues, object type queues and additional or alternative components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    said at least one processing device being configured:
    to establish at least first and second groups of synchronization objects in a storage system based at least in part on synchronization object type, the first group of synchronization objects being established for a first synchronization object type, the second group of synchronization objects being established for a second synchronization object type different than the first synchronization object type, and the first and second groups of synchronization objects being associated with respective ones of a first synchronization object type queue and a second synchronization object type queue, with each such synchronization object type queue being implemented at least in part utilizing the memory; and
    for each of the first and second groups of synchronization objects:
    to insert entries into a corresponding one of the synchronization object type queues for respective synchronization objects of a corresponding one of the first and second groups of synchronization objects;
    to execute on the processor an associated one of a plurality of monitor threads, the associated monitor thread being for the corresponding group, the associated monitor thread being configured to scan the entries of the corresponding synchronization object type queue for synchronization object issue detection, in accordance with one or more designated detection conditions, wherein different detection conditions are designated for use with different ones of the first and second groups of synchronization objects; and
    responsive to at least one of the scanned entries meeting the one or more designated detection conditions, to take at least one automated action for its associated synchronization object;

wherein the associated monitor thread is configured to operate in accordance with a series of monitoring cycles and wherein one or more synchronization objects added to the corresponding group in a given one of the monitoring cycles have corresponding entries inserted into an additional queue, and further wherein the entries inserted into the additional queue are subsequently merged into the synchronization object type queue for the corresponding group; and wherein taking at least one automated action comprises executing a callback function specified for the corresponding group, the callback function being specified for the corresponding group in conjunction with establishing the corresponding group for the synchronization object type.

2. The apparatus of claim 1 wherein said at least one processing device comprises at least a subset of a plurality of processing cores of the storage system.

3. The apparatus of claim 1 wherein said at least one processing device executes threads of one or more applications utilizing at least one of a plurality of processing cores of the storage system, the threads of the one or more applications comprising different sub-threads of a first thread of a first application executing on a particular one of the plurality of processing cores of the storage system.

4. The apparatus of claim 3 wherein the first application comprises a block-storage application of the storage system and the first thread comprises a truck thread that when executing on the particular processing core is configured to utilize at least a portion of available processing resources of that processing core.

5. The apparatus of claim 3 wherein each of the sub-threads of the first thread is in one of multiple designated states at a particular point in time, including a running state, a ready state and a suspended state.

6. The apparatus of claim 5 wherein different ones of the sub-threads that are in the suspended state are enqueued in respective different ones of a plurality of thread queues in order to wait for access to respective corresponding synchronization objects associated with resources of the particular processing core.

7. The apparatus of claim 1 wherein the synchronization objects comprise one or more of:
respective distinct locks in the storage system; and
at least one of a semaphore, a timer, a barrier, a memory pool and a thread pool.

8. The apparatus of claim 1 wherein establishing at least first and second groups of synchronization objects in a storage system based at least in part on synchronization object type comprises:
receiving registration information for a particular synchronization object type via an application programming interface; and
establishing a group for the particular synchronization object type based at least in part on the registration information.

9. The apparatus of claim 1 wherein the entries in the additional queue for the one or more synchronization objects added to the group of synchronization objects in the given monitoring cycle are subsequently merged into the synchronization object type queue for the corresponding group in conjunction with completion of the given monitoring cycle and are monitored by the associated monitor thread via their entries in the synchronization object type queue in a next monitoring cycle.

10. The apparatus of claim 1 wherein one or more synchronization objects to be deleted from the corresponding group of synchronization objects in a given one of the monitoring cycles have their respective entries marked as deleted in the synchronization object type queue in the given monitoring cycle and any entries so marked are removed from the synchronization object type queue by the associated monitor thread in conjunction with the scan of the entries of the synchronization object type queue.

11. The apparatus of claim 1 wherein taking at least one automated action further comprises at least one of:
generating an alert to at least one other thread;
performing one or more diagnostic operations; and
storing identifying information of at least one other thread holding the corresponding synchronization object.

12. A computer program product comprising a non-transitory processor-readable storage medium having stored therein program code of one or more software programs, wherein the program code when executed by at least one processing device comprising a processor coupled to a memory, causes said at least one processing device:
to establish at least first and second groups of synchronization objects in a storage system based at least in part on synchronization object type, the first group of synchronization objects being established for a first synchronization object type, the second group of synchronization objects being established for a second synchronization object type different than the first synchronization object type, and the first and second groups of synchronization objects being associated with respective ones of a first synchronization object type queue and a second synchronization object type queue, with each such synchronization object type queue being implemented at least in part utilizing the memory; and for each of the first and second groups of synchronization objects:
to insert entries into a corresponding one of the synchronization object type queues for respective synchronization objects of a corresponding one of the first and second groups of synchronization objects;
to execute on the processor an associated one of a plurality of monitor threads, the associated monitor thread being for the corresponding group, the associated monitor thread being configured to scan the entries of the corresponding synchronization object type queue for synchronization object issue detection, in accordance with one or more designated detection conditions, wherein different detection conditions are designated for use with different ones of the first and second groups of synchronization objects; and
responsive to at least one of the scanned entries meeting the one or more designated detection conditions, to take at least one automated action for its associated synchronization object;

wherein the associated monitor thread is configured to operate in accordance with a series of monitoring cycles and wherein one or more synchronization objects added to the corresponding group in a given one of the monitoring cycles have corresponding entries inserted into an additional queue, and further wherein the entries inserted into the additional queue are subsequently merged into the synchronization object type queue for the corresponding group; and wherein taking at least one automated action comprises executing a callback function specified for the corresponding group, the callback function being specified for the corresponding group in conjunction with establishing the corresponding group for the synchronization object type.

13. The computer program product of claim 12 wherein the synchronization objects comprise one or more of:
respective distinct locks in the storage system; and
at least one of a semaphore, a timer, a barrier, a memory pool and a thread pool.

14. A method performed by at least one processing device comprising a processor coupled to a memory, the method comprising:
establishing at least first and second groups of synchronization objects in a storage system based at least in part on synchronization object type, the first group of synchronization objects being established for a first synchronization object type, the second group of synchronization objects being established for a second synchronization object type different than the first synchronization object type, and the first and second groups of synchronization objects being associated with respective ones of a first synchronization object type queue and a second synchronization object type queue, with each such synchronization object type queue being implemented at least in part utilizing the memory; and
for each of the first and second groups of synchronization objects:
inserting entries into a corresponding one of the synchronization object type queues for respective synchronization objects of a corresponding one of the first and second groups of synchronization objects;
executing on the processor an associated one of a plurality of monitor threads, the associated monitor thread being for the corresponding group, the associated monitor thread being configured to scan the entries of the corresponding synchronization object type queue for synchronization object issue detection, in accordance with one or more designated detection conditions, wherein different detection conditions are designated for use with different ones of the first and second groups of synchronization objects; and
responsive to at least one of the scanned entries meeting the one or more designated detection conditions, taking at least one automated action for its associated synchronization object;
wherein the associated monitor thread is configured to operate in accordance with a series of monitoring cycles and wherein one or more synchronization objects added to the corresponding group in a given one of the monitoring cycles have corresponding entries inserted into an additional queue, and further wherein the entries inserted into the additional queue are subsequently merged into the synchronization object type queue for the corresponding group; and
wherein taking at least one automated action comprises executing a callback function specified for the corresponding group, the callback function being specified for the corresponding group in conjunction with establishing the corresponding group for the synchronization object type.

15. The method of claim 14 wherein the synchronization objects comprise one or more of:
respective distinct locks in the storage system; and
at least one of a semaphore, a timer, a barrier, a memory pool and a thread pool.

16. The method of claim 14 wherein said at least one processing device executes threads of one or more applications utilizing at least one of a plurality of processing cores of the storage system, the threads of the one or more applications comprising different sub-threads of a first thread of a first application executing on a particular one of the plurality of processing cores of the storage system.

17. The method of claim 14 wherein establishing at least first and second groups of synchronization objects in a storage system based at least in part on synchronization object type comprises:
receiving registration information for a particular synchronization object type via an application programming interface; and
establishing a group for the particular synchronization object type based at least in part on the registration information.

18. The method of claim 14 wherein the entries in the additional queue for the one or more synchronization objects added to the group of synchronization objects in the given monitoring cycle are subsequently merged into the synchronization object type queue for the corresponding group in conjunction with completion of the given monitoring cycle and are monitored by the associated monitor thread via their entries in the synchronization object type queue in a next monitoring cycle.

19. The method of claim 14 wherein one or more synchronization objects to be deleted from the corresponding group of synchronization objects in a given one of the monitoring cycles have their respective entries marked as deleted in the synchronization object type queue in the given monitoring cycle and any entries so marked are removed from the synchronization object type queue by the associated monitor thread in conjunction with the scan of the entries of the synchronization object type queue.

20. The method of claim 14 wherein taking at least one automated action further comprises at least one of:
generating an alert to at least one other thread;
performing one or more diagnostic operations; and
storing identifying information of at least one other thread holding the corresponding synchronization object.

* * * * *